US012765648B2

(12) United States Patent
Kim et al.

(10) Patent No.: US 12,765,648 B2
(45) Date of Patent: Oct. 20, 2026

(54) ELECTRONIC DEVICE

(71) Applicant: Samsung Electronics Co., Ltd., Suwon-si (KR)

(72) Inventors: Donghyun Kim, Suwon-si (KR); Sanghyuck Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 18/366,196

(22) Filed: Aug. 7, 2023

(65) Prior Publication Data

US 2023/0389662 A1 Dec. 7, 2023

Related U.S. Application Data

(63) Continuation of application No. PCT/KR2022/004017, filed on Mar. 23, 2022.

(30) Foreign Application Priority Data

Apr. 15, 2021 (KR) ........................ 10-2021-0049009

(51) Int. Cl.
*G04B 37/14* (2006.01)
*A44C 5/14* (2006.01)

(52) U.S. Cl.
CPC ................ *A44C 5/14* (2013.01); *G04B 37/14* (2013.01)

(58) Field of Classification Search
CPC ........ A44C 5/14; G04B 37/14; G04B 17/063; G04B 17/325; G04G 17/08
See application file for complete search history.

(56) References Cited

U.S. PATENT DOCUMENTS

| | | | | |
|---|---|---|---|---|
| 4,217,681 A * | 8/1980 | Grohoski | A44C 5/14 224/164 |
| 6,014,793 A | 1/2000 | Howald | |
| 10,327,520 B1 * | 6/2019 | Ely | G04B 47/046 |

(Continued)

FOREIGN PATENT DOCUMENTS

| | | |
|---|---|---|
| JP | 4415170 B2 | 2/2010 |
| JP | 2016-010571 A | 1/2016 |

(Continued)

OTHER PUBLICATIONS

International Search Report dated Jun. 14, 2022, issued in International Application No. PCT/KR2022/004017.

*Primary Examiner* — Sean Kayes
(74) *Attorney, Agent, or Firm* — Jefferson IP Law, LLP

(57) ABSTRACT

An electronic device is provided. The electronic device includes a housing comprising a front plate, a rear plate spaced apart from the front plate, and a side frame, a band which comprises a connecting portion that is detachably connected to the housing, and is provided to be worn on the body of a user, and a fastening portion which fixes the connecting portion to the housing, wherein the side frame includes a connecting slot which is concavely formed in the outer circumferential surface, wherein the connecting portion is inserted in the connecting slot along an insertion direction, and wherein the fastening portion, is configured to connect the side frame and the connecting portion while passing through the side frame and the connecting portion in a fastening direction that is inclined with respect to the insertion direction.

20 Claims, 15 Drawing Sheets

(56) References Cited

U.S. PATENT DOCUMENTS

| | | | | |
|---|---|---|---|---|
| 10,895,846 | B2 * | 1/2021 | Raffy | G04B 37/0454 |
| 10,993,512 | B2 * | 5/2021 | Rochat | G04B 37/1493 |
| 11,022,943 | B2 * | 6/2021 | Romano | G04B 37/1486 |
| 11,517,082 | B2 * | 12/2022 | Schlichtig | G04B 37/22 |
| 2005/0111306 | A1 * | 5/2005 | Saaski | G04B 37/1486<br>368/282 |

FOREIGN PATENT DOCUMENTS

| | | | |
|---|---|---|---|
| KR | 10-1994-0026682 | A | 12/1994 |
| KR | 10-0523657 | B1 | 12/2005 |
| KR | 10-2016-0028664 | A | 3/2016 |
| KR | 10-2018-0024570 | A | 3/2018 |
| KR | 10-2021-0029074 | A | 3/2021 |

* cited by examiner

ELECTRONIC DEVICE

CROSS-REFERENCE TO RELATED APPLICATION(S)

This application is a continuation application, claiming priority under § 365(c), of an International application No. PCT/KR2022/004017, filed on Mar. 23, 2022, which is based on and claims the benefit of a Korean patent application number filed on Apr. 15, 2021, in the Korean Intellectual Property Office, the disclosure of which is incorporated by reference herein in its entirety.

BACKGROUND

1. Field

The disclosure relates to an electronic device.

2. Description of Related Art

The development of electronic technology has accelerated the development and distribution of electronic products of various types. For example, the distribution of electronic devices wearable on the body, such as wearable electronic devices, is expanding.

The above information is presented as background information only to assist with an understanding of the disclosure. No determination has been made, and no assertion is made, as to whether any of the above might be applicable as prior art with regard to the disclosure.

SUMMARY

Wearable electronic devices may be worn on the body and may thus be required to be aesthetically desirable in design. For example, a wearable electronic device worn on the wrist may have a circular shape in design, as shown in a wristwatch. The wearable electronic device may include a band to be attached to the body of a user, and the band may be detachably fastened to a main body of the wearable electronic device such that it is replaceable at the user's discretion. In this case, the main body may be required to have a fastening space for the band to be fastened.

Aspects of the disclosure are to address at least the above-mentioned problems and/or disadvantages and to provide at least the advantages described below. Accordingly, an aspect of the disclosure is to provide a fastening structure corresponding to a circular shape of a housing that may be employed to fasten a band to a main body, and a variety of aesthetic senses in designing the main body.

According to various embodiments, minimizing a space occupied by the fastening structure of the band and the housing may secure a maximum internal space of the housing in which components are to be provided.

According to various embodiments, simplifying the fastening structure of the band and the housing may reduce a unit cost for manufacturing an electronic device and achieve a high level of managing performance.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a front plate, a rear plate spaced apart from the front plate, and a side frame enclosing an internal space between the front plate and the rear plate along a circumferential direction of the front plate and the rear plate, a band including a connecting portion that is detachably connected to the housing, and provided to be worn on a body of a user, and a fastening portion configured to fix the connecting portion to the housing, wherein the side frame may include a connecting slot formed to be recessed on an outer circumferential surface, wherein at least a portion of the connecting portion is inserted into the connecting slot along an insertion direction from the outer circumferential surface of the side frame toward an inner circumferential surface of the side frame, and wherein the fastening portion connects the side frame and the connecting portion while passing therethrough, in a fastening direction inclined with respect to the insertion direction, as viewed from the front plate.

In accordance with another aspect of the disclosure, an electronic device is provided. The electronic device includes a housing including a front plate, a rear plate spaced apart from the front plate, and a side frame enclosing an internal space between the front plate and the rear plate, a band including a connecting portion that is detachably connected to the side frame and provided to be worn on a body of a user, and a fastening portion configured to fix the connecting portion to the side frame, wherein the side frame includes a connecting slot that forms a ring shape with respect to a central axis passing through the front plate and the rear plate and formed to be recessed on an outer circumferential surface, wherein at least a portion of the connecting portion is inserted into the connecting slot along an insertion direction, and wherein the fastening portion connects the side frame and the connecting portion along a fastening direction that is inclined with respect to the insertion direction and that substantially contacts an imaginary circle having the central axis as a center thereof.

According to various embodiments, securing a fastening space for a housing and a band using a space between an inner circumferential surface and an outer circumferential surface of a ring-shaped side frame may minimize a space occupied by a fastening structure.

According to various embodiments, omitting a lug structure for fastening the housing and the band may achieve a variety of aesthetic senses in designing the housing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
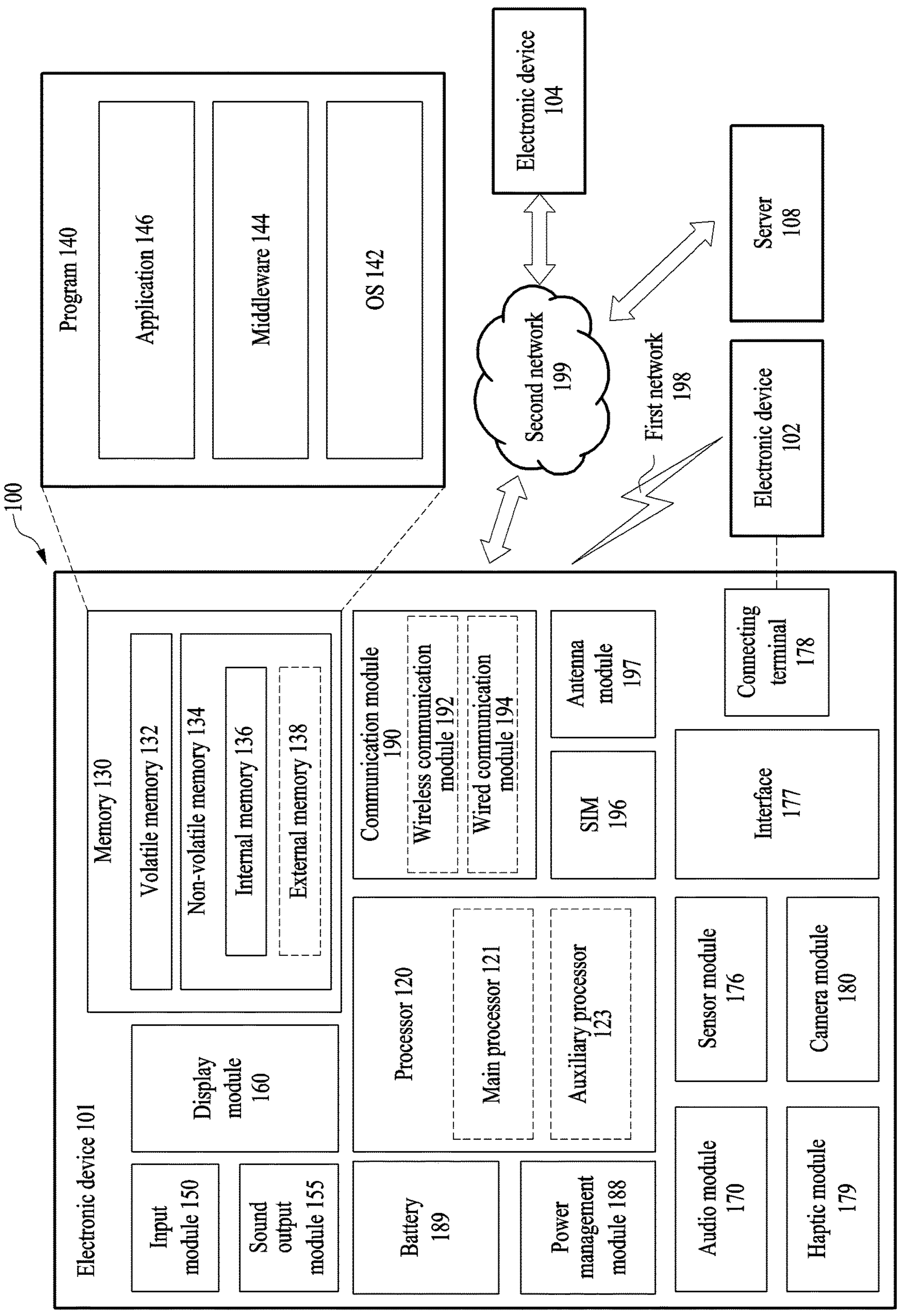
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). The electronic device 101 may communicate with the electronic device 104 via the server 108. The electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. The processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specifically for artificial intelligence (AI) model processing. An AI model may be generated by machine learning. The learning may be performed by, for example, the electronic device 101, in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. The receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control its corresponding one of the displays, the hologram device, and the projector. The display module 160 may include a touch sensor adapted to sense a touch, or a pressure sensor adapted to measure an intensity of a force of the touch.

The audio module 170 may convert sound into an electric signal or vice versa. The audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with an external electronic device (e.g., the electronic device 102) directly (e.g., by wire) or wirelessly. The interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). The connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. The haptic module 179 may include, for example, a motor, a piezoelectric element, or an electric stimulator.

The camera module 180 may capture a still image and a moving image. The camera module 180 may include one or more lenses, image sensors, ISPs, and flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., an LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a $4^{th}$ generation (4G) network, and a next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 gigabits (Gbps) or more) for implementing eMBB, loss coverage (e.g., 164 decibels (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to various embodiments, the antenna module 197 may form an mmWave antenna module. The mmWave antenna module may include a PCB, an RFIC on a first surface (e.g., a bottom surface) of the PCB or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

According to an embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. All or some of operations to be executed by the electronic device 101 may be executed by one or more of the external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or service, may request one or more external electronic devices to perform at least a part of the function or service. The one or more external electronic devices receiving the request may perform the at least part of the function or the service requested, or an additional function or an additional service related to the request and may transfer a result of the performance to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra-low latency services using, e.g., distributed computing or MEC. According to another embodiment, the external electronic device (e.g., the electronic device 104) may include an Internet-of-things (IoT) device. The server 108 may be an intelligent server using machine learning and/or a neural network. The external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2A:
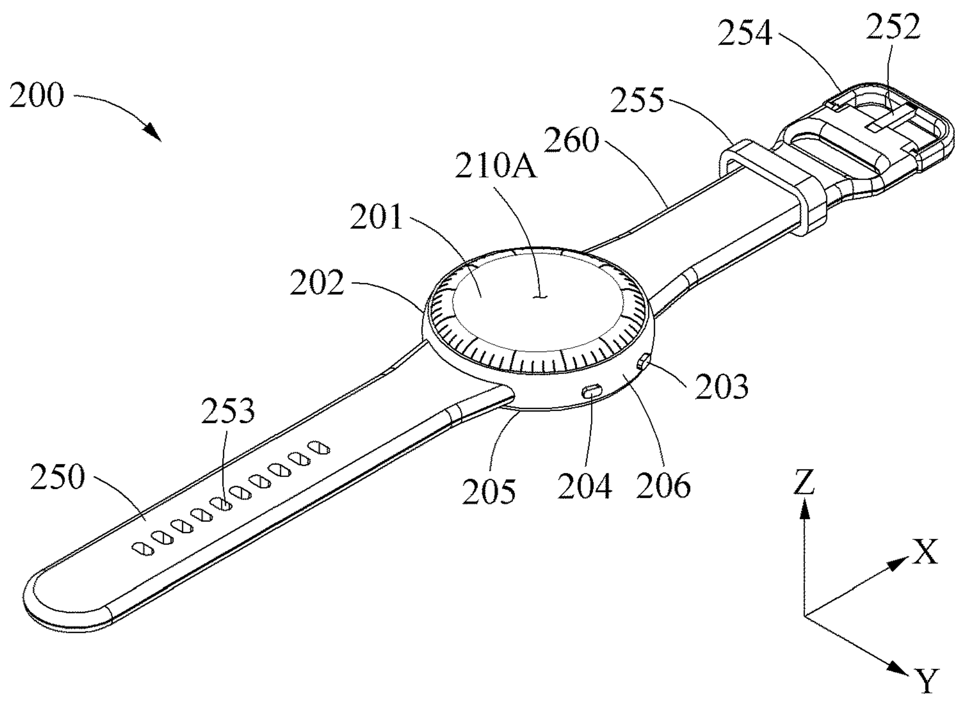
FIGS. 2A and 2B are perspective views of an electronic device according to various embodiments of the disclosure.
Figure 2B:
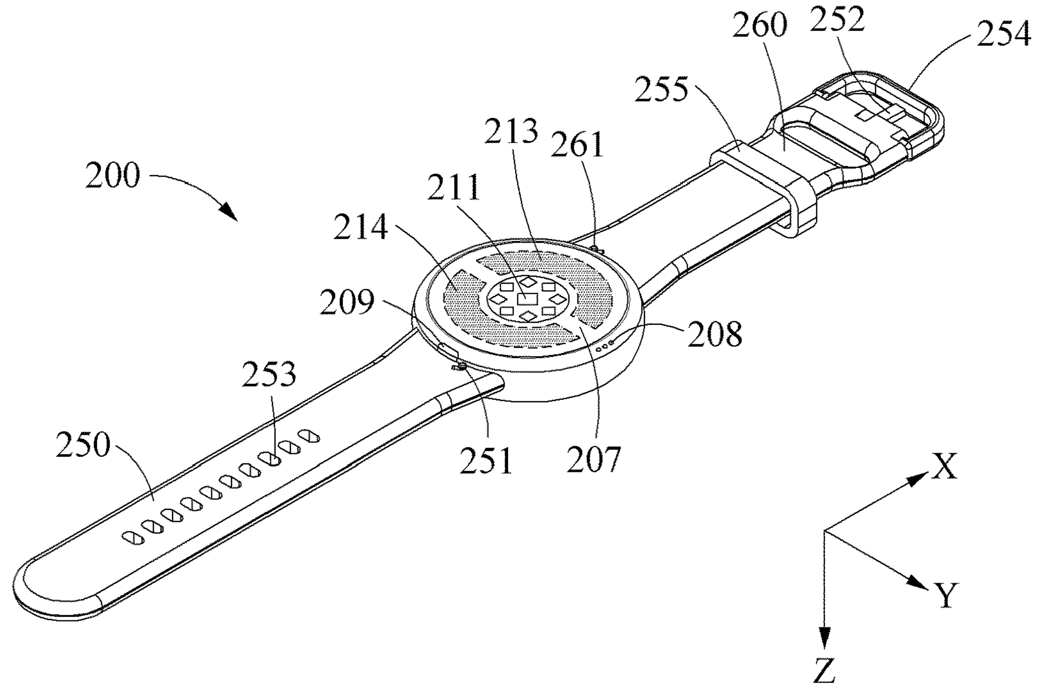

FIGS. 2A and 2B are perspective views of an electronic device according to various embodiments of the disclosure.

Referring to FIGS. 2A and 2B, according to an embodiment, an electronic device 200 (e.g., the electronic device 101 of FIG. 1) may include a housing 210 including a first surface 210A (or a front surface), a second surface 210B (or a rear surface), and a side surface 210C surrounding a space between the first surface 210A and the second surface 210B, and bands 250 and 260 connected to at least a portion of the housing 210 and configured to detachably attach the electronic device 200 to a body part (e.g., wrist, ankle, etc.) of a user. In another embodiment (not shown), a housing may also refer to a structure that forms a portion of the first surface 210A, the second surface 210B, and the side surface 210C shown in FIG. 2A. According to an embodiment, the first surface 210A may be formed by a front plate 201 (e.g., a glass plate or a polymer plate including various coating layers) of which at least a portion is substantially transparent. The second surface 210B may be formed by a rear plate 207 that is substantially opaque. The rear plate 207 may be formed of, for example, coated or tinted glass, ceramic, polymer, metal (e.g., aluminum, stainless steel (STS), or magnesium), or a combination of at least two thereof. The side surface 210C may be formed by a side frame 206 (e.g., a side bezel structure) coupled to the front plate 201 and the rear plate 207 and including metal and/or polymer. In some embodiments, the rear plate 207 and the side frame 206 may be integrally formed and may include the same material (e.g., a metal material such as aluminum). The bands 250 and 260 may be formed of various materials and shapes. For example, a woven fabric, leather, rubber, urethane, metal, ceramic, or a combination of at least two thereof may be used to form an integral type and allow a plurality of unit links to be flowable to each other.

According to an embodiment, the electronic device 200 may include at least one of a display 220 (refer to FIG. 3), audio modules 205 and 208, a sensor module 211, key input devices 202, 203, and 204, and a connector hole 209. In some other embodiments, the electronic device 200 may not include at least one of the components (e.g., the key input devices 202, 203, and 204, the connector hole 209, or the sensor module 211) or additionally include other components.

The display 220 may be exposed through, for example, a considerable portion of the front plate 201. The display 220 may have a shape corresponding to that of the front plate 201 and may also have various shapes such as a circle, an oval, or a polygon. The display 220 may be coupled to or disposed adjacent to a touch sensing circuit, a pressure sensor that may measure the intensity (or pressure) of a touch, and/or a fingerprint sensor.

The audio modules 205 and 208 may include a microphone hole 205 and a speaker hole 208. The microphone hole 205 may have a microphone for obtaining an external sound that is disposed inside thereof. In some embodiments, a plurality of microphones may be disposed to detect a direction of a sound. The speaker hole 208 may be used as an external speaker and a receiver for calls. In some embodiments, the speaker hole 208 and the microphone hole 205 may be implemented as a single hole, or a speaker (e.g., a piezo speaker) may be included without the speaker hole 208.

The sensor module 211 may generate an electrical signal or a data value corresponding to an internal operating state of the electronic device 200 or an external environmental state. The sensor module 211 may include, for example, a biosensor module 211 (e.g., a heart rate monitor (HRM) sensor) disposed on the second surface 210B of the housing 210. The electronic device 200 may further include at least one of sensor modules (not shown), for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The sensor module 211 may include electrode areas 213 and 214 that form a portion of the surface of the electronic device 200 and a bio signal detection circuit (not shown) electrically connected to the electrode areas 213 and 214. For example, the electrode areas 213 and 214 may include a first electrode area 213 and a second electrode area 214 disposed on the second surface 210B of the housing 210. The sensor module 211 may be configured such that the electrode areas 213 and 214 obtain an electrical signal from a body part of the user, and the biosignal detection circuit detects biometric information of the user based on the electrical signal.

The key input devices 202, 203, and 204 may include a wheel key 202 disposed on the first surface 210A of the housing 210 and rotatable in at least one direction, and/or side key buttons 203 and 204 disposed on the side surface 210C of the housing 210. The wheel key 202 may have a shape corresponding to that of the front plate 201. In another embodiment, the electronic device 200 may not include some or all of the foregoing key input devices 202, 203, and 204, and the key input devices 202, 203, and 204 that are not included may be implemented in other forms such as soft keys on the display 220.

The connector hole 209 may include another connector hole (not shown) that accommodates a connector (e.g., a universal serial bus (USB) connector) for transmitting and receiving power and/or data to and from an external electronic device and accommodates a connector for transmitting and receiving an audio signal to and from an external electronic device. The electronic device 200 may further include, for example, a connector cover (not shown) that covers at least a portion of the connector hole 209 and prevents an inflow of foreign substances into the connector hole 209.

The bands 250 and 260 may be detachably attached to at least a portion of the housing 210 using locking members 251 and 261. The bands 250 and 260 may include one or more of a fixing member 252, a fixing member fastening hole 253, a band guide member 254, and a band fixing ring 255.

The fixing member 252 may be configured to fix the housing 210 and the bands 250 and 260 to a body part (e.g., a wrist, an ankle, etc.) of the user. The fixing member fastening hole 253 may correspond to the fixing member 252 to fix the housing 210 and the bands 250 and 260 to the body part of the user. The band guide member 254 may be configured to limit a movement range of the fixing member 252 when the fixing member 252 is fastened to the fixing member fastening hole 253, such that the bands 250 and 260 are closely attached to the body part of the user. The band fixing ring 255 may limit a movement range of the bands 250 and 260 while the fixing member 252 and the fixing member fastening hole 253 are fastened to each other.

Figure 3:
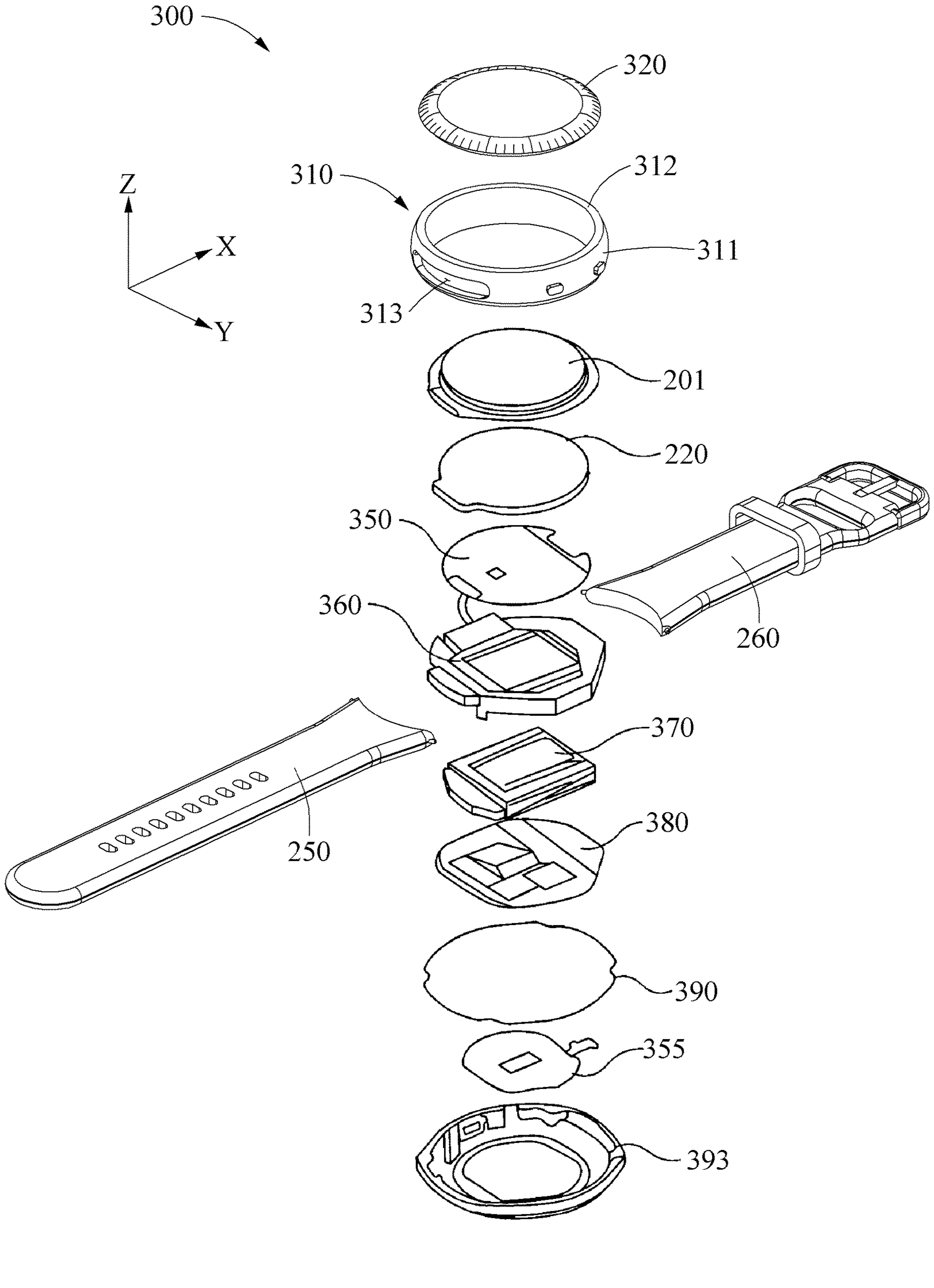
FIG. 3 is an exploded perspective view of an electronic device according to an embodiment of the disclosure.

Referring to FIG. 3, an electronic device 300 (e.g., the electronic device 101 of FIG. 1 or the electronic device 200 of FIGS. 2A and 2B) may include a side frame 310 (e.g., a side bezel structure), a wheel key 320, a front plate 201, a display 220, a first antenna 350, a second antenna 355, a support member 360 (e.g., a bracket), a battery 370, a printed circuit board (PCB) 380, a sealing member 390, a rear plate 393, and bands 259 and 260. At least one of the components of the electronic device 300 may be the same as or similar to at least one of the components of the electronic device 101 of FIG. 1 or the electronic device 200 of FIG. 2A, and a repeated description thereof will be omitted hereinafter.

In an embodiment, the side frame 310 may enclose an internal space formed between the front plate 201 and the rear plate 393. The side frame 310 may include an outer circumferential surface 312 exposed to the outside and an inner circumferential surface 311 facing the internal space. On the outer circumferential surface 312 of the side frame 310, a pair of connecting slots 313 may be formed to be recessed in a direction of the internal space such that a portion of the bands 250 and 260 is inserted therein.

The support member 360 may be disposed inside the electronic device 300 to be connected to the side frame 310 or may be integrally formed with the side frame 310. The support member 360 may be formed of, for example, a metal material and/or a non-metal material (e.g., polymer). The display 220 may be connected to one surface of the support member 360, and the PCB 380 may be connected to another surface of the support member 360. The PCB 380 may include a processor, a memory, and/or an interface that are provided thereon. The processor may include, for example, one or more of a central processing unit (CPU), a graphics processing unit (GPU), an application processor (AP), a sensor processor, or a communication processor.

The memory may include, for example, a volatile memory or a non-volatile memory. The interface may include, for example, a high-definition multimedia interface (HDMI), a USB interface, a secure digital (SD) card interface, or an audio interface. For example, the interface may electrically or physically connect the electronic device 300 to an external electronic device and may include, for example, a USB connector, an SD card/multimedia card (MMC) connector, or an audio connector.

The battery 370, which is a device for supplying power to at least one component of the electronic device 300, may include, for example, a non-rechargeable primary battery, a rechargeable secondary battery, or a fuel cell. For example, at least a portion of the battery 370 may be disposed on substantially the same plane as the PCB 380. The battery 370 may be disposed integrally inside the electronic device 300 or disposed detachably from the electronic device 300.

The first antenna 350 may be disposed between the display 220 and the support member 360. The first antenna 350 may include, for example, a near-field communication (NFC) antenna, a wireless charging antenna, and/or a magnetic secure transmission (MST) antenna. For example, the first antenna 350 may perform short-range communication with an external device, wirelessly transmit and receive power required for charging, or transmit a magnetism-based signal including a short-range communication signal or payment data. In another embodiment, an antenna structure may be formed by a portion of the side frame 310 and/or the support member 360 or a combination thereof.

The second antenna 355 may be disposed between the PCB 380 and the rear plate 393. The second antenna 355 may include, for example, an NFC antenna, a wireless charging antenna, and/or an MST antenna. For example, the second antenna 355 may perform short-range communication with an external device, wirelessly transmit and receive power required for charging, or transmit a magnetism-based signal including a short-range communication signal or payment data. In another embodiment, an antenna structure may be formed by a portion of the side frame 310 and/or the rear plate 393 or a combination thereof.

The sealing member 390 may be disposed between the side frame 310 and the rear plate 393. The sealing member 390 may be configured to prevent moisture and foreign substances from flowing into a space surrounded by the side frame 310 and the rear plate 393 from the outside.

Figure 4A:
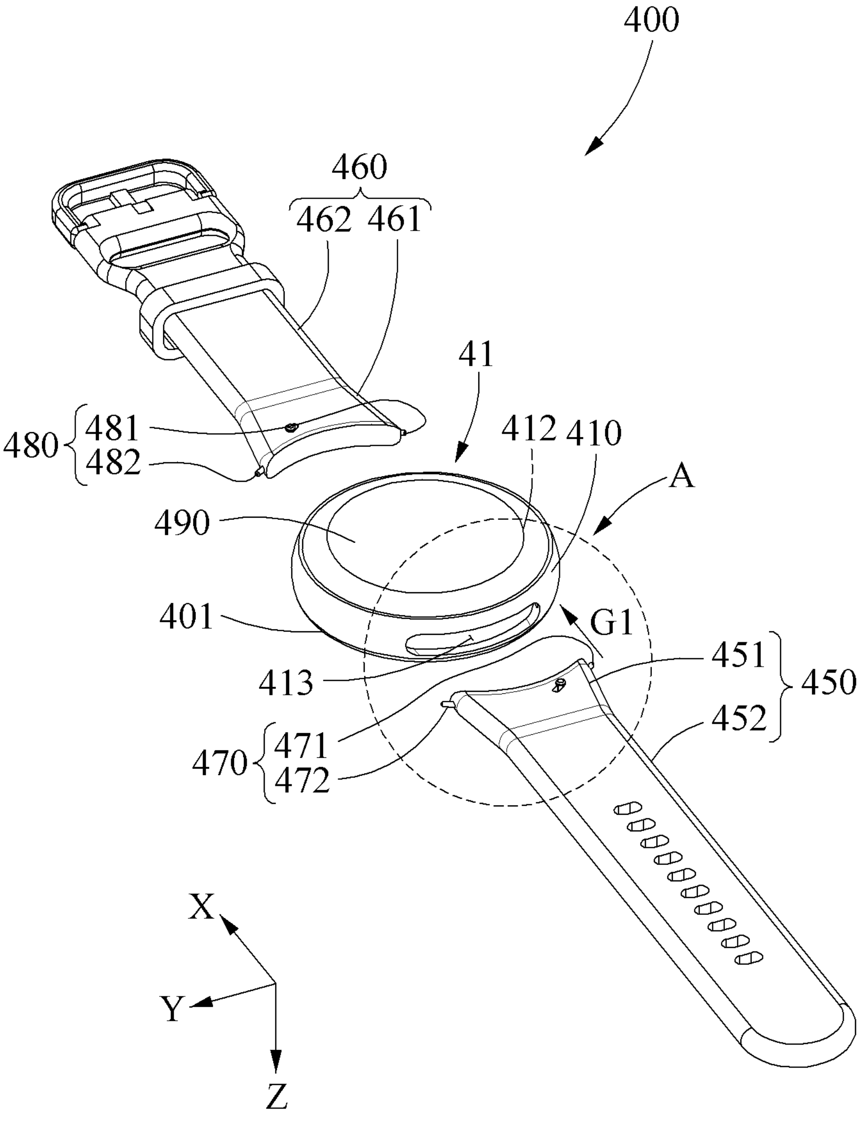
FIG. 4A is a perspective view of an electronic device with a housing and a band detached therefrom according to an embodiment of the disclosure.
Figure 4B:
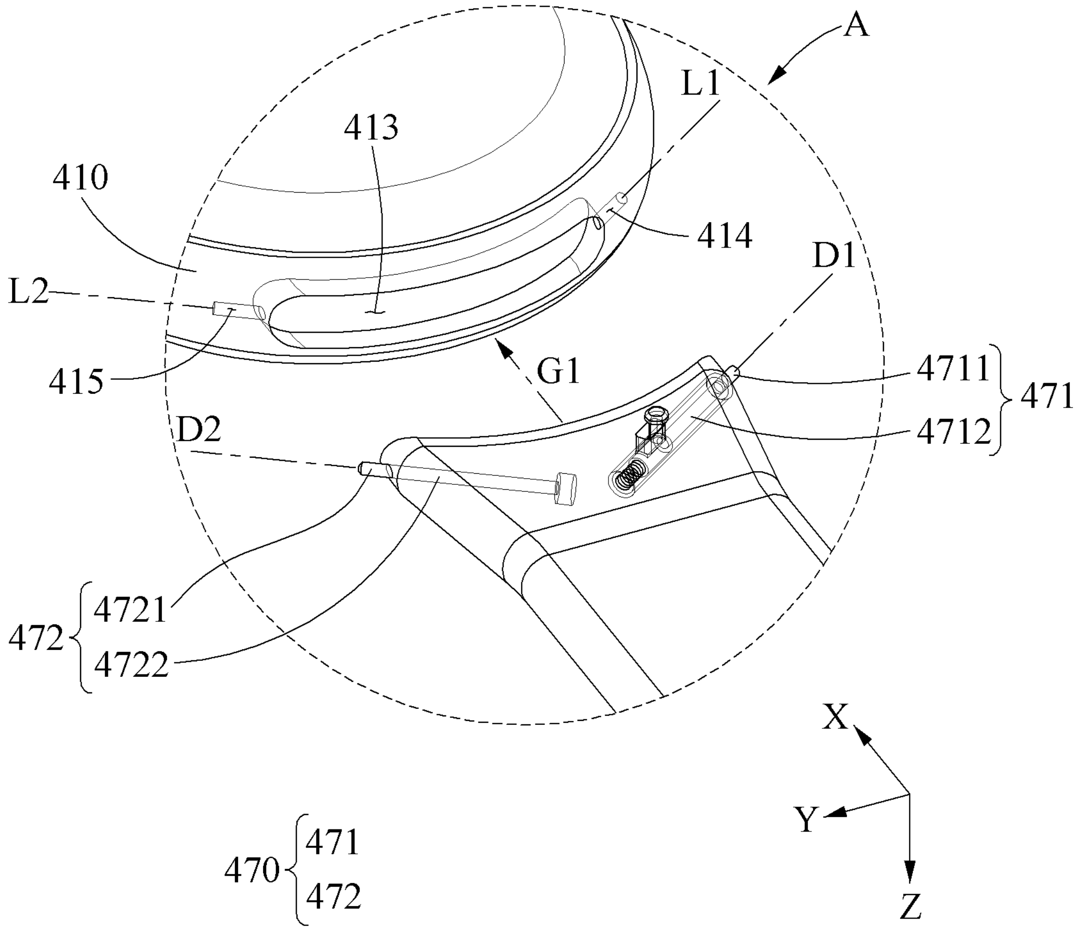
FIG. 4B is an enlarged perspective view of an area A of FIG. 4A according to an embodiment of the disclosure.
Figure 4C:
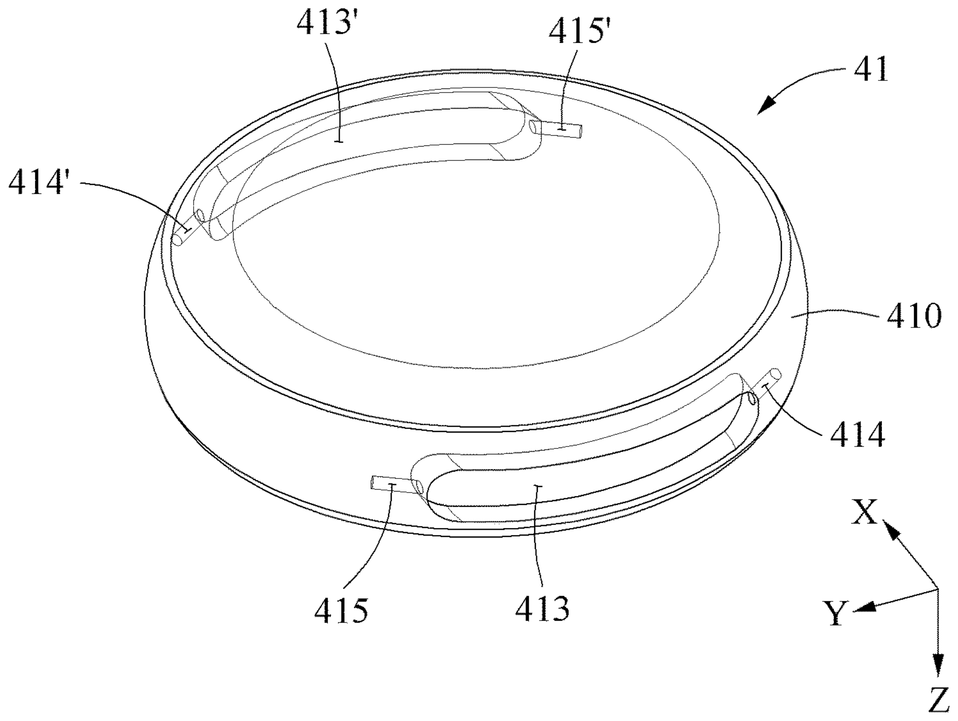
FIG. 4C is a perspective view of a housing according to an embodiment of the disclosure.
Figure 4D:
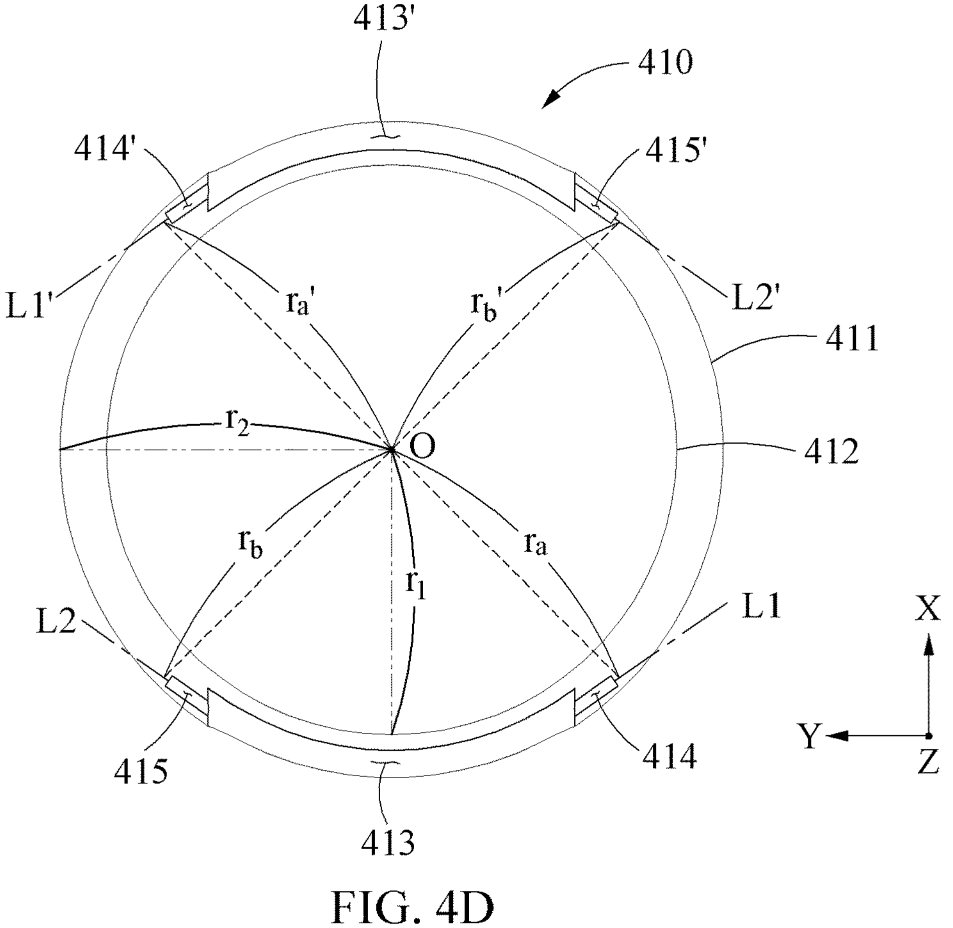
FIG. 4D is a perspective view of a side frame according to an embodiment of the disclosure.
Figure 4E:
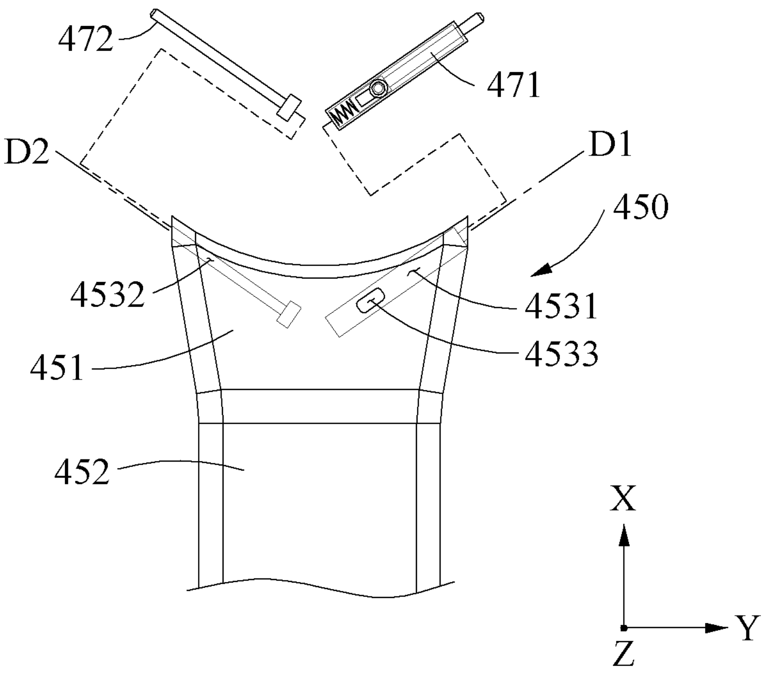
FIG. 4E is a perspective view of a band according to an embodiment of the disclosure.
Figure 4F:
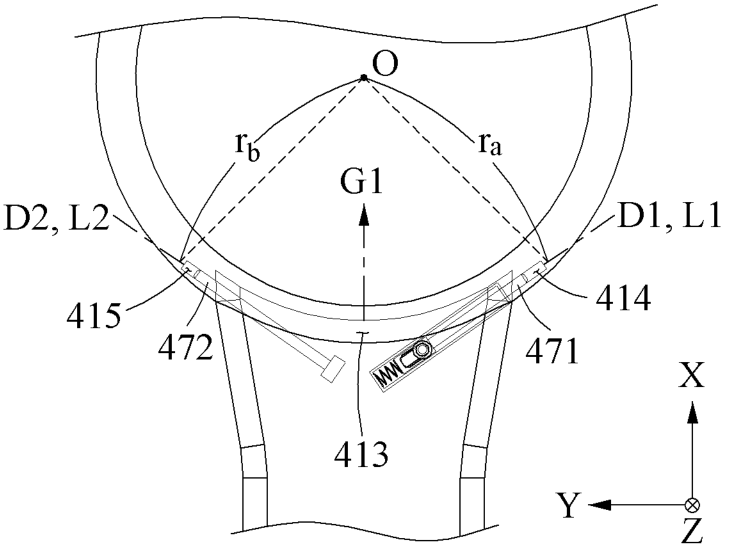
FIG. 4F is a perspective view of a coupling state in which a side frame and a band are coupled according to an embodiment of the disclosure.
Figure 5:
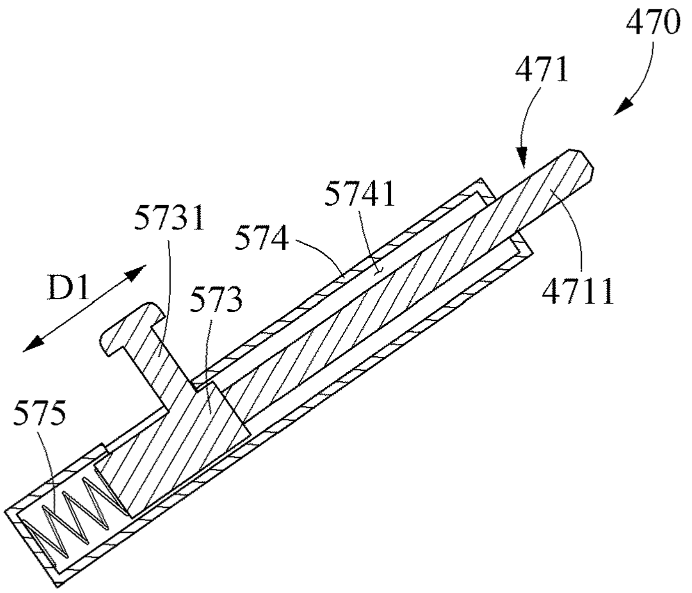
FIG. 5 is a perspective view of a first fastening portion according to an embodiment of the disclosure.

FIG. 4A is an exploded perspective view of an electronic device according to an embodiment of the disclosure. FIG. 4B is an enlarged perspective view of an area A of FIG. 4A according to an embodiment of the disclosure. FIG. 4C is a perspective view of a housing according to an embodiment of the disclosure. FIG. 4D is a perspective view of a side frame according to an embodiment of the disclosure. FIG. 4E is a perspective view of a band according to an embodiment of the disclosure. FIG. 4F is a perspective view of a coupling state in which a side frame and a band are coupled according to an embodiment of the disclosure. FIG. 5 is a perspective view of a first fastening portion according to an embodiment of the disclosure.

Referring to FIGS. 4A to 4F, according to an embodiment, an electronic device 400 (e.g., the electronic device 101 of FIG. 1, the electronic device 200 of FIG. 2A, or the electronic device 300 of FIG. 3) may be a wearable electronic device that may be worn on a body part of a user. The electronic device 400 may be, for example, a smartwatch worn on a wrist of the user.

In an embodiment, the electronic device 400 may include a housing 41 that accommodates therein components, bands 450 and 460 detachably fastened to the housing 41 and detachably attach the electronic device 400 to the body part (e.g., a wrist) of the user, and fastening portions 470 and 480 configured to fix a fastening state of the housing 41 and the bands 450 and 460. In an embodiment, as a fastening structure required to fasten the housing 41 and the bands 450 and 460 is formed to correspond to the shape of the housing 41, the electronic device 400 may have a reduced space occupied by the fastening structure.

In an embodiment, the housing 41 may include a front plate 401, a rear plate 490, and a side frame 410.

In an embodiment, the front plate 401 may form a first surface (or a front surface) (e.g., the first surface 210A of FIG. 2A) that is exposed to the outside of the housing 41. The rear plate 490 may form a second surface (or a rear surface) (e.g., the second surface 210B of FIG. 2A) that is exposed to the outside of the housing 41. In this case, the front plate 401 and the rear plate 490 may be spaced apart from each other to form an internal space therebetween. When viewed in a direction (e.g., a Z-axis direction of FIG. 4A) of the front plate 401, the front plate 401 and the rear plate 490 may be formed in a circular shape having the same central axis O.

In an embodiment, the side frame 410 may enclose the internal space between the front plate 401 and the rear plate 490 along a circumferential direction relative to the central axis O of the front plate 401 and the rear plate 490. When viewed in the direction (e.g., a Z-axis direction of FIG. 4D) of the front plate 401, the side frame 410 may form a ring shape with the center axis O as the origin. The side frame 410 may include an outer circumferential surface 411 that is exposed to the outside, and an inner circumferential surface 412 that faces the internal space between the front plate 401 and the rear plate 490. The side frame 410 may include a connecting slot 413 that is formed to be recessed on the outer circumferential surface 411. The connecting slot 413 may be stepped toward the inner circumferential surface 412 of the side frame 410. In an embodiment, the connecting slot 413 may include a first connecting slot 413 and a second connecting slot 413' formed in two different portions of the outer circumferential surface 411 of the side frame 410, respectively. In this case, the first connecting slot 413 and the second connecting slot 413' may be formed in symmetrical directions relative to the central axis (e.g., an X-axis direction and a −X-axis direction of FIG. 4C), respectively, based on a state viewed in the direction (e.g., the Z-axis direction of FIG. 4A) of the front plate 401.

In an embodiment, the side frame 410 may include a first fastening hole 414 and a second fastening hole 415 into which a first fastening pin 471 and a second fastening pin 472 described below are to be inserted. The first fastening hole 414 and the second fastening hole 415 may be formed between the inner circumferential surface 412 and the outer circumferential surface 411 of the side frame 410 and may communicate with the connecting slot 413. For example, the first fastening hole 414 and the second fastening hole 415 may be formed through an inner side surface of the connecting slot 413. In this case, the first fastening hole 414 may be formed in a first fastening direction L1, and the second fastening hole 415 may be formed in a second fastening direction L2. In an embodiment, the side frame 410 may include a pair of first fastening holes 414 and 414' and a pair of second fastening holes 415 and 415' communicating with the first connecting slot 413 and the second connecting slot 413', respectively.

The bands 450 and 460 may be detachably connected to the housing 41 and may be worn on the body of the user. In an embodiment, the bands 450 and 460 may include connecting portions 451 and 461 that are detachably connected to the housing 41, for example, the side frame 410, and attachment portions 452 and 462 that extend in a longitudinal direction from the connecting portions 451 and 461 and are wound around the body of the user. In an embodiment, the bands 450 and 460 may be configured as a pair including a first band 450 and a second band 460. The first band 450 and the second band 460 may be fastened to different portions of the housing 41 through the connecting portions 451 and 461, respectively. The first band 450 and the second band 460 may fix the electronic device 400 to the body as they are fastened to each other through the attachment portions 452 and 462, respectively, while being attached to the body of the user.

In an embodiment, the bands 450 and 460 may be connected to the side frame 410 through the connecting portions 451 and 461. For example, the connecting portions 451 and 461 may be at least partially inserted into the connecting slots 413 and 413' formed on the outer circumferential surface 411 of the side frame 410 along an insertion direction G1 from the outer circumferential surface 411 of the side frame 410 toward the inner circumferential surface 412. In this case, the insertion direction G1 in which the connecting portions 451 and 461 are inserted into the connecting slot 413 may be parallel to the longitudinal direction in which the attachment portions 452 and 462 extend from the connecting portions 451 and 461. Hereinafter, the direction in which the connecting portions 451 and 461 are inserted into the connecting slots 413 and 413' will be referred to as the insertion direction G1. In an embodiment, the connecting slots 413 and 413' and the connecting portions 451 and 461 may be formed to engage with each other. For example, the connecting slot 413 may include a shape curved along a circumferential direction of the side frame 410 as shown in FIG. 4D, and ends of the connecting portions 451 and 461 may include a curved surface corresponding to the connecting slot 413, as shown in FIG. 4E. By this structure, when the connecting portions 451 and 461 are fully inserted in the connecting slot 413, the ends of the connecting portions 451 and 461 and a bottom surface of the connecting slot 413 may engage with each other to be in contact with each other, and a gap between the connecting slot 413 and the connecting portions 451 and 461 may be minimized, and thus the connecting portions 451 and 461 may be stably inserted into the connecting slot 413.

In an embodiment, the first band 450 may be fastened to the first connecting slot 413 and the second band 460 may be fastened to the second connecting slot 413'. The connecting portions 451 and 461 of the first band 450 and the second band 460 may be inserted into the first connecting slot 413 and the second connecting slot 413', respectively. When the first connecting slot 413 and the second connecting slot 413' are formed at points that are symmetrical about a central axis O of the side frame 410, the insertion direction G1 in which the connecting portions 451 and 461 of the first band 450 are inserted into the first connecting slot 413 and the insertion direction G1 in which the connecting portions 451 and 461 of the second band 460 are inserted into the second connecting slot 413' may face opposite directions. By this structure, the first band 450 and the second band 460, while connected to the side frame 410, may have longitudinal directions extending in opposite directions with the housing 41 therebetween, and may thus be easily wrapped around and attached to the body of the user.

The fastening portions 470 and 480 may fix the connecting portions 451 and 461 to the housing 41. In an embodiment, the fastening portions 470 and 480 may include a first fastening portion 470 that fixes the connecting portion 451 of the first band 450 to the housing 41 and a second fastening portion 480 that fixes the connecting portion 461 of the second band 460 to the housing 41. For the convenience of description, the following discussion of a connecting structure of the bands 450 and 460 with respect to the housing 41 will focus on a fastening structure of the first band 450 and the housing 41.

The fastening portion 470 may prevent the connecting portion 451 from escaping from the connecting slot 413 by fixing the connecting portion 451 to the side frame 410 while the connecting portion 451 is inserted in the connecting slot 413. In an embodiment, the fastening portion 470 may connect the side frame 410 and the connecting portion 451 by passing therethrough, along fastening directions L1 and L2. A fastening direction may be inclined with respect to the insertion direction G1, when viewing the front plate 401 (e.g., viewed from a Z-axis direction, as shown in FIG. 4B).

In an embodiment, the fastening portion 470 may connect the side frame 410 and the connecting portion 451 in a first fastening direction L1 and a second fastening direction L2 that are inclined to the insertion direction G1, relative to a direction of viewing the front plate 401. In this case, the first fastening direction L1 and the second fastening direction L2 may face opposite sides to each other, relative to the insertion direction G1. For example, based on a state in which the front plate 401 is viewed, the first fastening direction L1 and the second fastening direction L2 may form substantially the same angle with respect to the insertion direction G1. However, this is provided only as an example, and the first fastening direction L1 and the second fastening direction L2 may form different angles with respect to the insertion direction G1.

In an embodiment, the fastening portion 470 may include a first fastening pin 471 that connects the side frame 410 and the connecting portion 451 in the first fastening direction L1, and a second fastening pin 472 that connects the side frame 410 and the connecting portion 451 in the second fastening direction L2. Each of the first fastening pin 471 and the second fastening pin 472 may be connected, while passing through, the side frame 410 and the connecting portion 451, with the connecting portion 451 inserted in the connecting slot 413 of the side frame 410. At least some portions 4712, 4722 of the first fastening pin 471 and the second fastening pin 472 may be inserted to be fixed to the connection portion 451, with ends 4711, 4721 protruding outside the connection portion 451. For example, first fastening pin 471 and second fastening pin 472 may have ends 4711 and 4721 protruding through a surface area of the connecting portion 451 that contacts the inner circumferential surface 412 in the connecting slot 413. In this case, with the connecting portion 451 inserted in the connecting slot 413, the one end 4711 of the first fastening pin 471 and the second fastening pin 472 may be inserted into an inner side of the side frame 410 through the connecting slot 413, and the connecting portion 451 and the side frame 410 may thereby be connected. In an embodiment, the first fastening pin 471 and the second fastening pin 472 may be fixed to the connecting portion 451. For example, the connecting portion 451 may include a first fixing portion 4531 into which at least a portion of the first fastening pin 471 is inserted, and a second fixing portion 4532 into which at least a portion of the second fastening pin 472 is inserted. In this case, the surface of the connecting portion 451 may have an opening 4533 that communicates with the first fixing portion 4531. The opening 4533 will be described below. The first fastening pin 471 and the second fastening pin 472 may be inserted to be fixed to the connecting portion 451 through the first fixing portion 4531 and the second fixing portion 4532, and the ends 4711 and 4721 may protrude outwardly from the connecting portion 451. In an embodiment, the first fastening pin 471 and the second fastening pin 472 may be directly inserted and connected to a first fixing portion 4531 and a second fixing portion 4532, but this is provided only as an example, and a method by which the first fastening pin 471 and the second fastening pin 472 are inserted into and fixed to the connecting portion 451 is not limited to the foregoing example. For example, the first fastening pin 471 and the second fastening pin 472 may be integrally connected through an insert injection process during a manufacture of the band 450.

In an embodiment, the one end 4711 of the first fastening pin 471 may protrude outside the connecting portion 451 along a first protruding direction D1, and the one end 4721 of the second fastening pin 472 may protrude outside the connecting portion 451 along a second protruding direction D2. The first protruding direction D1 and the second protruding direction D2 may be inclined with respect to the insertion direction G1 of the connecting portion 451 into the connecting slot 413, that is, inclined with respect to the longitudinal direction of the attachment portions 452. In this case, with the connecting portion 451 inserted in the connecting slot 413, the first protruding direction D1 and the second protruding direction D2 may correspond to the first fastening direction L1 and the second fastening direction L2, respectively. Thus, as shown in FIG. 4F, with the connecting portion 451 inserted in the connecting slot 413, as the one end 4711 of the first fastening pin 471 protruding along the first protruding direction is inserted into the first fastening hole 414 and the one end 4721 of the second fastening pin 472 protruding along the second protruding direction is inserted into a second fastening hole 415, a connecting state between the connecting portion 451 and the side frame 410 may be fixed.

Although, for the convenience of description, the foregoing description focuses on a structure in which the first fastening portion 470 fixes a connecting state of the connecting portion 451 and the side frame 410 while the connecting portion 451 of the first band 450 is inserted in the first connecting slot 413, the second fastening portion 480 may fix a connecting state of the second band 460 and the side frame 410 in a similar way to the first fastening portion 470 as the second fastening portion 480 includes a first fastening pin 481 and a second fastening pin 482 that fix the connecting state of the connecting portion 461 and the side frame 410 while the connecting portion 461 of the second band 460 is inserted in a second connecting slot 413' and the first fastening pin 481 and the second fastening pin 482 are inserted into a first fastening hole 414' and a second fastening hole 415' formed in the second connecting slot 413'. In an embodiment, a fastening direction in which the fastening portions 470 and 480 connect the side frame 410 and the connecting portions 451 and 461 may be tangent to an imaginary circle with a central axis O passing through the front plate 401 and the rear plate 490 as a center. For example, as shown in FIG. 4D, relative to a central axis direction (e.g., the Z-axis direction in FIG. 4D), the inner circumferential surface 412 of the side frame 410 may form a circle with a radius $r_1$ and the outer circumferential surface 411 of the side frame 410 may form a circle with a radius $r_2$. In this case, a first fastening direction L1 formed by the first fastening hole 414 communicating with the first connecting slot 413 may be tangent to a circle with a central axis O as the origin and a radius $r_a$, and a second fastening direction L2 formed by the second fastening hole 415 may be tangent to a circle with the central axis O as the origin and a radius $r_b$. Each of $r_a$ and $r_b$ may have a length greater than $r_1$ and less than r 2. Similarly, a first fastening direction L1' formed by the first fastening hole 414' communicating with the second connecting slot 413' may be tangent to a circle with the central axis O as the origin and a radius $r_a'$, and a second fastening direction L2' formed by the second fastening hole 415' may be tangent to a circle with the central axis O as the origin and a radius $r_b'$. Each of $r_a$ and $r_b'$ may have a length greater than $r_1$ and less than $r_2$. That is, the first fastening holes 414 and 414' and the second fastening holes 415 and 415' may be formed between the inner circumferential surface 412 and the outer circumferential surface 411 of the side frame 410.

In this case, with the connecting portion 451 of the band 450 inserted in the connecting slot 413, the respective ends 4711 and 4721 of the first fastening pin 471 and the second fastening pin 472, respectively, may be inserted into the first fastening hole 414 and the second fastening hole 415 along the first fastening direction L1 and the second fastening direction L2 to fix a connecting state of the side frame 410 and the connecting portion 451.

Such a structure may allow the fastening portion 470 to fasten the side frame 410 and the band 450 in response to the shape of the side frame 410 without a separate lug structure and may thereby achieve diversity of the side frame 410 in terms of design. Additionally, when the side frame 410 has a ring shape, the fastening portion 470 may fasten the band 450 and the side frame 410 in response to the shape of the side frame 410, and thus a space occupied by such a fastening structure in the electronic device 400 may be minimized.

In addition, the fastening portion 470 may connect the band 450 to the housing 41 through a space between the inner circumferential surface 412 and the outer circumferential surface 411 of the side frame 410, and thus an area occupied by the fastening structure in the internal space of the housing 41 may be removed. Thus, the internal space of the housing 41 may secure a maximum size of a mounting area for accommodating therein components.

In an embodiment, at least one of the first fastening pin 471 or the second fastening pin 472 may be movably connected to the connecting portion 451 such that the protruding ends 4711 and 4721 may be received in the inside of the connecting portion 451. For example, the first fastening pin 471 may be movable inside a first fixing portion 4531 such that the end 4711 may selectively protrude outside the first fixing portion 4531. The following discussion assumes that the end 4711 of the first fastening pin 471 selectively protrudes outside the connecting portion 451.

Referring to FIG. 5, according to an embodiment, the fastening portion 470 may include a cylinder 574 disposed inside the first fixing portion 4531 and including a cavity 5741 into which the first fastening pin 471 is slidably inserted, an elastic body 575 disposed inside the cavity 5741 and applying an elastic force to the first fastening pin 471, and a trigger 5731 connecting the elastic body 575 and the first fastening pin 471.

The cylinder 574 may be fixedly inserted inside the first fixing portion 4531. The cylinder 574 may include the cavity 5741 formed along the first protruding direction D1 while inserted in the first fixing portion 4531. In the cavity 5741 of the cylinder 574, the first fastening pin 471 may be slidably inserted.

Inside the cavity 5741, the elastic body 575 may be disposed. The elastic body 575 may apply an elastic force in a direction that allows an end of the first fastening pin 471 to protrude outside the first fixing portion 4531, that is, a direction that pushes the first fastening pin 471 out of the connecting portion 451 along the first protruding direction D1. With no external force applied to the elastic body 575, the end of the first fastening pin 471 may protrude outside the first fixing portion 4531.

The trigger 5731 may be disposed within the cavity 5741 and may connect the first fastening pin 471 and the elastic body 575. The trigger 5731 may have a portion of its surface protruding outside the cylinder 574. In this case, the protruding surface of the trigger 5731 may be disposed in an opening 4533 formed on the surface of the connecting portion 451 and communicating with the first fixing portion 4531. The opening 4533 may be formed along a sliding direction of the first fastening pin 471, i.e., the first protruding direction D1. Such a structure may allow the surface of the trigger 5731 protruding outside the cylinder 574 to be exposed to the outside of the connecting portion 451 through the opening 4533, and may thus allow the first fastening pin 471 to slide along the protruding direction by manipulation of the user.

Although the description provided above with reference to FIG. 5 focuses on a configuration that moves the first fastening pin 471 through the cylinder 574, the elastic body 575, and the trigger 5731, the configuration described above with reference to FIG. 5 may be provided only as an example and may also be applied to move the second fastening pin 472.

Figure 6A:
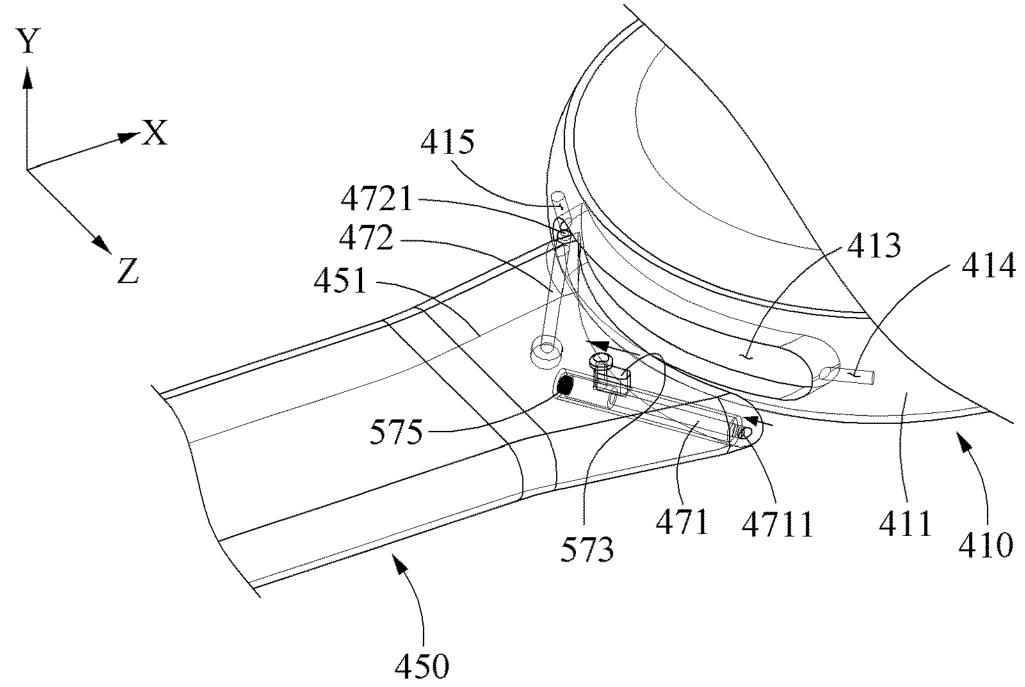
FIGS. 6A and 6B illustrate a process by which a band is coupled to a side frame in an electronic device according to various embodiments of the disclosure.
Figure 6B:
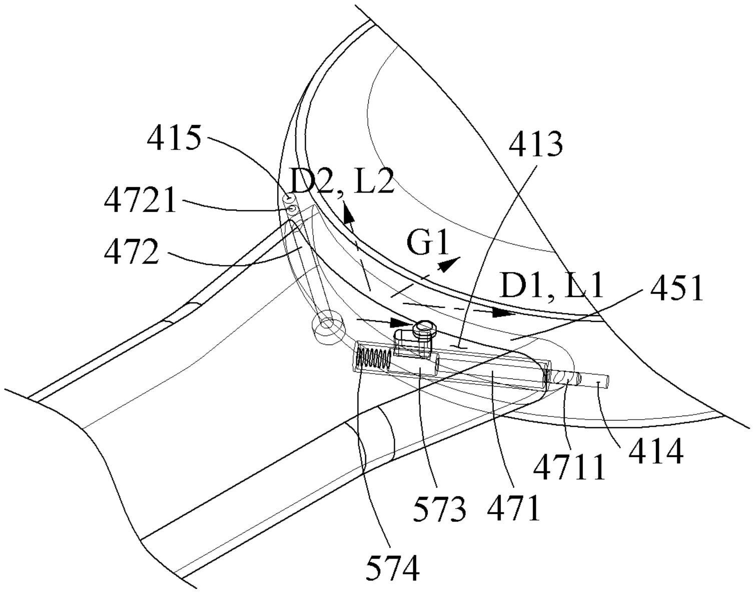

FIGS. 6A and 6B illustrate a process by which a band is coupled to a side frame in an electronic device according to various embodiments of the disclosure.

A process by which the band 450 is fastened to the side frame 410 will be described hereinafter with reference to FIGS. 6A and 6B. While the band 450 is separated from the side frame 410 as shown in FIG. 6A, the connecting portion 451 may need to be inserted into the connecting slot 413 to fasten the band 450 to the side frame 410. In an embodiment, the first fastening pin 471 and the second fastening pin 472 may each be fixedly inserted into an inner side of the connecting portion 451, and the one end 4711 of the first fastening pin 471 and the one end 4721 of the second fastening pin 472 may protrude outside the connecting portion 451 along the first protruding direction D1 and the second protruding direction D2, respectively. In an embodiment, the inner side of the connecting slot 413 may have the first fastening hole 414 and the second fastening hole 415 formed in the first fastening direction L1 and the second fastening direction L2, respectively, that are inclined with respect to the insertion direction G1 in which the connecting portion 451 is inserted into the connecting slot 413.

In an embodiment, the connecting slot 413 may be formed to have a shape that engages with an end of the connecting portion 451, and thus, for the connecting portions 451 and 461 to be inserted into the connecting slot 413, at least one of the first fastening pin 471 or the second fastening pin 472 may need to be received in the inner side of the connecting portion 451 such that the first fastening pin 471 and the second fastening pin 472 are not caught on the outer circumferential surface 411 of the side frame 410. For example, when the trigger 5731 operates to be pulled in an inner side direction of the connecting portion 451 as shown in FIG. 6A, the protruding end 4711 of the first fastening pin 471 may be received in the inner side of the connecting portions 451 and 461 as the elastic body 575 is compressed. In this case, the connecting portions 451 and 461 may be inserted into the connecting slot 413 along the insertion direction G1.

In an embodiment, with the connecting portion 451 inserted in the connecting slot 413 as shown in FIG. 6B, the first protruding direction D1 in which the end 4711 of the first fastening pin 471 protrudes may correspond to the first fastening direction L1, and the second protruding direction D2 in which the end 4721 of the second fastening pin 472 protrudes may correspond to the second fastening direction L2. When the trigger 5731 is deactivated while the second fastening pin 472 is inserted in the second fastening hole 415, the end 4711 may protrude outside the connecting portion 451 while the first fastening pin 471 is sliding in the first protruding direction D1 by the restoration of the elastic body 575, and the protruding end 4711 may be inserted into the first fastening hole 414. In this case, the first fastening pin 471 and the second fastening pin 472 may connect, while passing through, the connecting portion 451 and the side frame 410 along the first fastening direction L1 and the second fastening direction L2, and thus a connecting state of the band 450 to the side frame 410 may be fixed.

Figure 7:
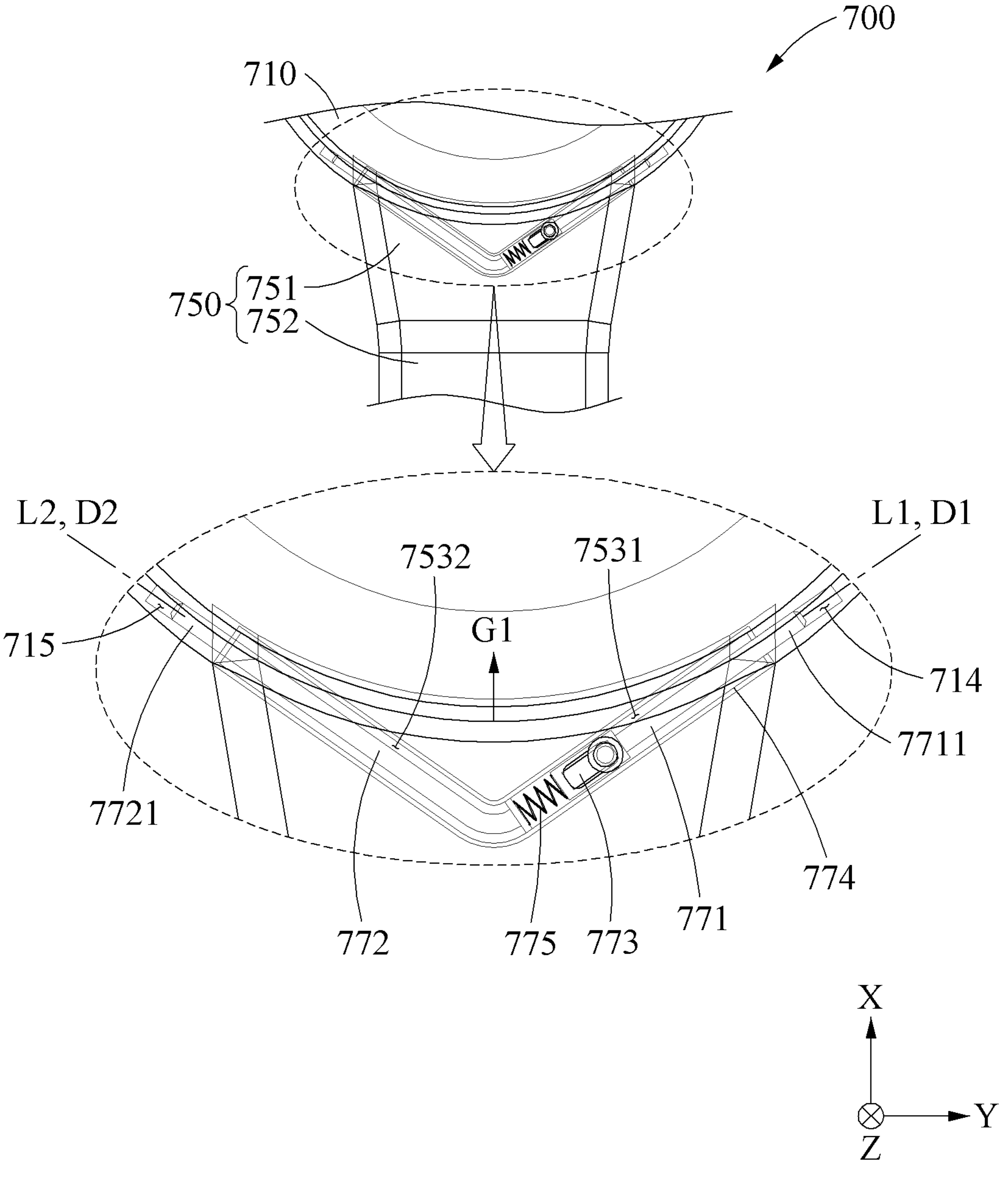
FIG. 7 is a partial perspective view of an electronic device according to an embodiment of the disclosure.

FIG. 7 is a partial perspective view of an electronic device according to an embodiment of the disclosure.

Referring to FIG. 7, according to an embodiment, an electronic device 700 (e.g., the electronic device 101 of FIG. 1 or the electronic device 200 of FIG. 2A) may include a side frame 710, a band 750, and a fastening portion.

In an embodiment, the side frame 710 may include a connecting slot 773 formed to be recessed on an outer circumferential surface, and a first fastening hole 714 and a second fastening hole 715 each communicating with the connecting slot 773 and formed along a first fastening direction L1 and a second fastening direction L2, respectively.

In an embodiment, the band 750 may include a connecting portion 751 that is inserted into the connecting slot 773, and an attachment portion 752 that extends from the connecting portion 751. The connecting portion 751 may be inserted into the connecting slot 773 along an insertion direction. In an embodiment, the connecting portion 751 may include a first fixing portion 7531 and a second fixing portion 7532 formed on an inner side thereof. With the connecting portion 751 inserted in the connecting slot 773, the first fixing portion 7531 may communicate with the first fastening hole 714 and the second fixing portion 7532 may communicate with the second fastening hole 715. In an embodiment, the first fixing portion 7531 and the second fixing portion 7532 may communicate inside the connecting portion 751. That is, the first fixing portion 7531 and the second fixing portion 7532 may be integrally formed to be connected to each other on the inner side of the connecting portion 751.

In an embodiment, the fastening portion may include a first fastening pin 771, a second fastening pin 772, a cylinder 774, an elastic body 775, and a trigger.

The first fastening pin 771 and the second fastening pin 772 may be inserted into the first fixing portion 7531 and the second fixing portion 7532, respectively, and ends 7711 and 7721 thereof may protrude outside the connecting portion 751 along a first protruding direction D1 and a second protruding direction D2. With the connecting portion 751 inserted in the connecting slot 773, the respective protruding ends 7711 and 7721 of the first fastening pin 771 and the second fastening pin 772 may be inserted into the first fastening hole 714 and the second fastening hole 715, respectively.

In an embodiment, the first fastening pin 771 may be inserted in the inside of the cylinder 774 and slide along the first protruding direction D1, and another end of the second fastening pin 772 facing the inside of the connecting portion 751 may be fixed to the cylinder 774. That is, the second fastening pin 772 may extend from the cylinder 774 disposed in the first fixing portion 7531 and the one end 7721 thereof may protrude outside the connecting portion 751 through the second fixing portion 7532. Such a structure may allow the first fastening pin 771 and the second fastening pin 772 to be integrally connected inside the connecting portion 751 and may thus prevent an insertion state of the first fastening pin 771 and the second fastening pin 772 with respect to the connecting portion 751 from being released in the course of using the electronic device 700.

Figure 8A:
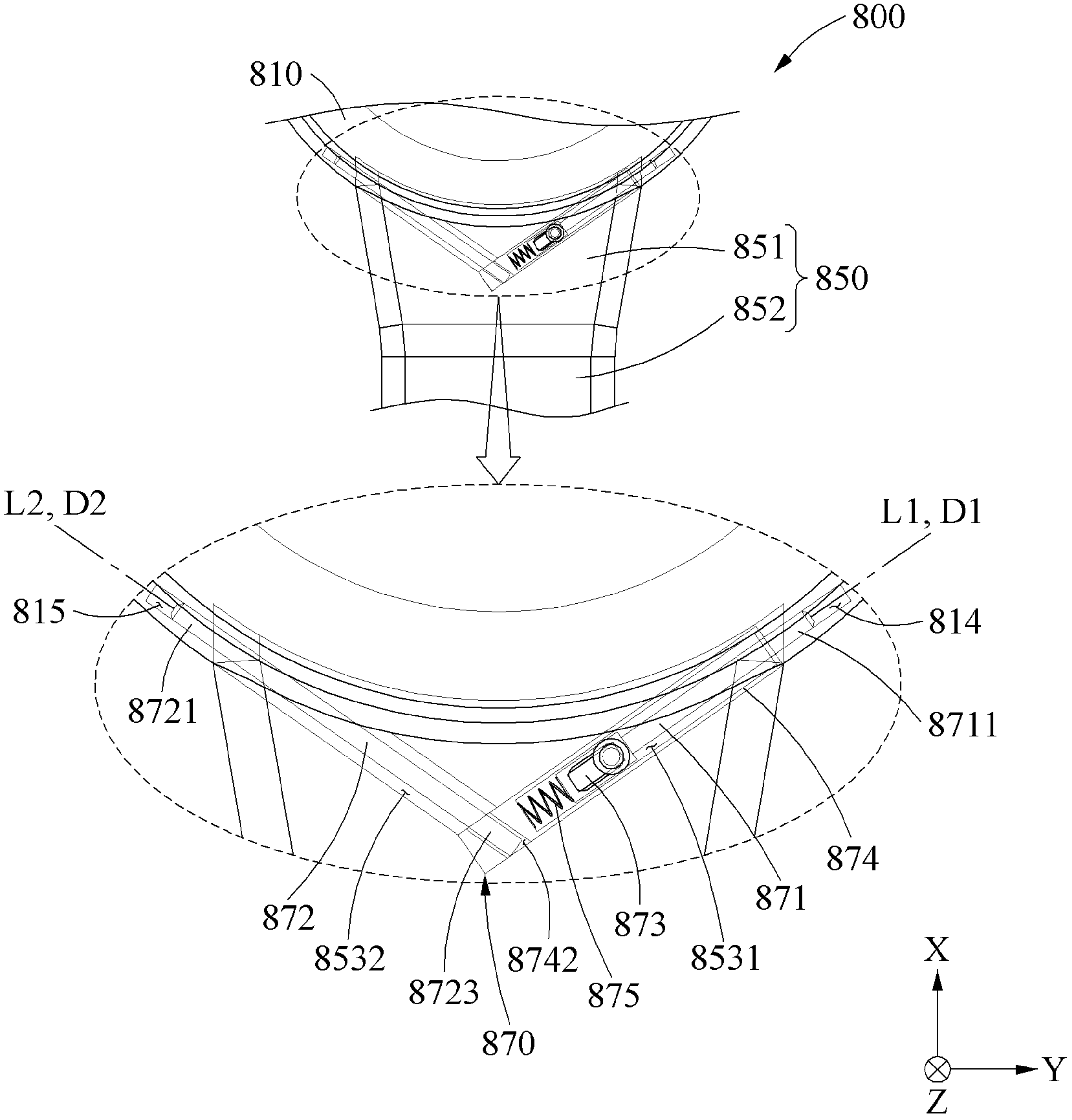
FIGS. 8A and 8B are partial perspective views of an electronic device according to various embodiments of the disclosure.
Figure 8B:
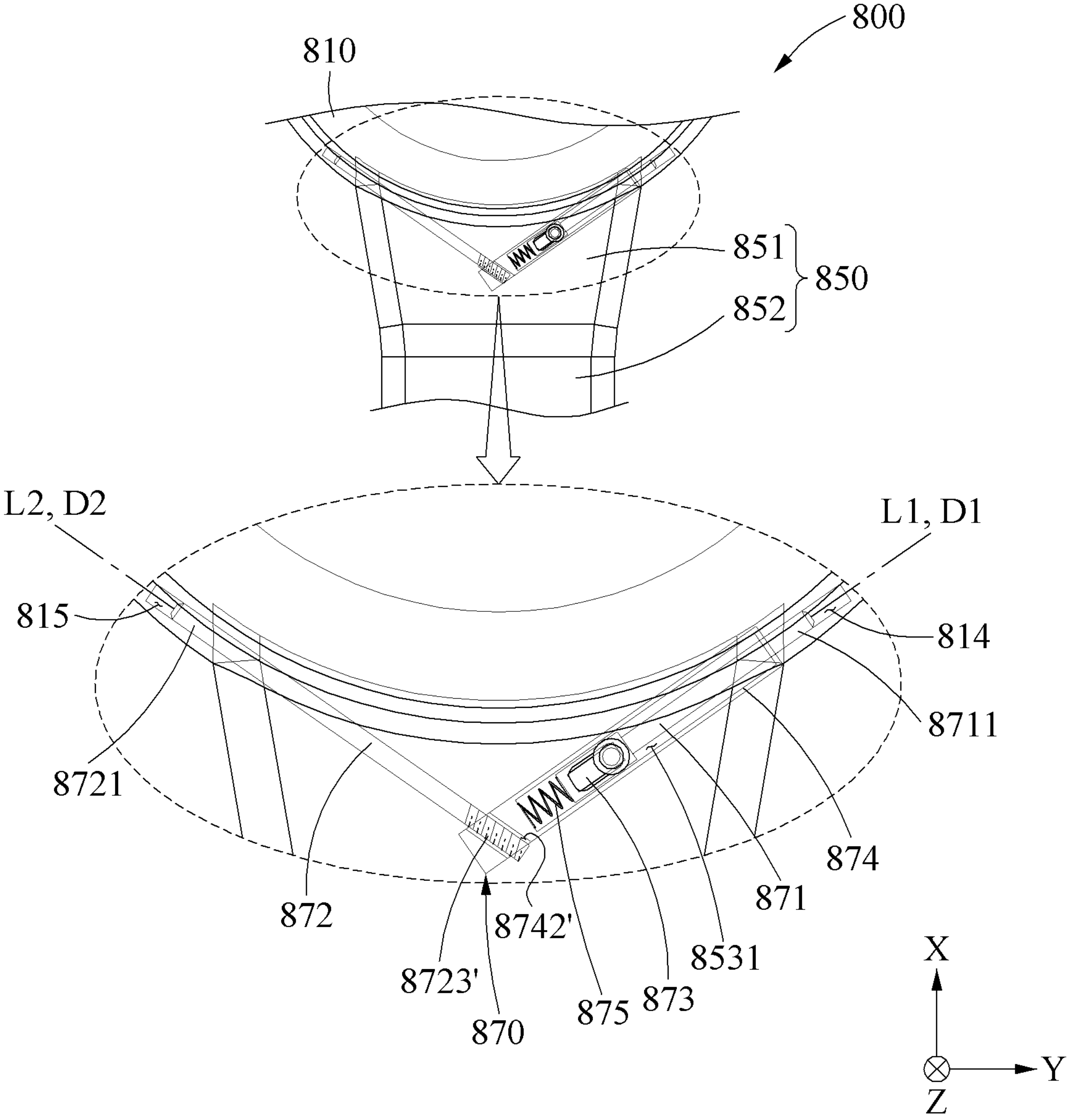

FIGS. 8A and 8B are partial perspective views of an electronic device according to various embodiments of the disclosure.

Referring to FIGS. 8A and 8B, according to an embodiment, an electronic device 800 may include a side frame 810, a band 850, and a fastening portion 870.

In an embodiment, the side frame 810 may include a connecting slot 813, a first fastening hole 814, and a second fastening hole 815. The first fastening hole 814 and the second fastening hole 815 may be formed along a first fastening direction L1 and a second fastening direction L2, respectively.

In an embodiment, the band 850 may include a connecting portion 851 and an attachment portion 852. The connecting portion 851 may include a first fixing portion 8531 and a second fixing portion 8532 that are inserted into the connecting slot 813 along an insertion direction G1 and formed inwardly. In this case, the first fixing portion 8531 and the second fixing portion 8532 may communicate with each other inside the connecting portion 851. With the connecting portion 851 inserted in the connecting slot 813, the first fixing portion 8531 may communicate with the first fastening hole 814, and the second fixing portion 8532 may communicate with the second fastening hole 815.

In an embodiment, the fastening portion 870 may include a first fastening pin 871, a second fastening pin 872, a cylinder 854, an elastic body 875, and a trigger 873. The first fastening pin 871 and the second fastening pin 872 may be inserted into the first fixing portion 8531 and the second fixing portion 8532, respectively, and ends 8711 and 8721 thereof may protrude outside the connecting portion 851 along a first protruding direction D1 and a second protruding direction D2, respectively. With the connecting portion 851 inserted in the connecting slot 813, the respective protruding ends 8711 and 8721 of the first fastening pin 871 and the second fastening pin 872 may be inserted into the first fastening hole 814 and the second fastening hole 815, respectively.

The cylinder 874 may include a cavity (e.g., the cavity 5741 of FIG. 1) that is inserted in the inside of the first fixing portion 8531 and formed along the first protruding direction D1. The first fastening pin 871 may be inserted into the cavity and may slide along the first protruding direction D1 at an operation of the trigger 873.

In an embodiment, the cylinder 874 may include a connecting groove 8742 that passes through its surface to communicate with the second fixing portion 8532, as shown in FIG. 8A. In this case, the other end 8723 of the second fastening pin 872 inserted in the second fixing portion 8532 may be inserted into the connecting groove 8742 through a point where the first fixing portion 8531 and the second fixing portion 8532 are connected. Such a structure may allow the first fastening pin 871 and the second fastening pin 872 to be inserted into the first fixing portion 8531 and the second fixing portion 8532, respectively, and also the first fastening pin 871 and the second fastening pin 872 to be integrally connected and fixed inside the connecting portion 851, thereby achieving a high level of release resistance strength while maintaining ease of assembly.

In addition, as shown in FIG. 8B, a first thread may be formed on an inner circumferential surface of a connecting groove 8742' formed in a cylinder, and a second thread may be formed on the other end 8723' of a second fastening pin 872 to engage with the first thread. In this case, the second fastening pin 872 may be connected to the connecting groove 8742' of the cylinder through screw coupling and may thus be more stably fastened.

Figure 9:
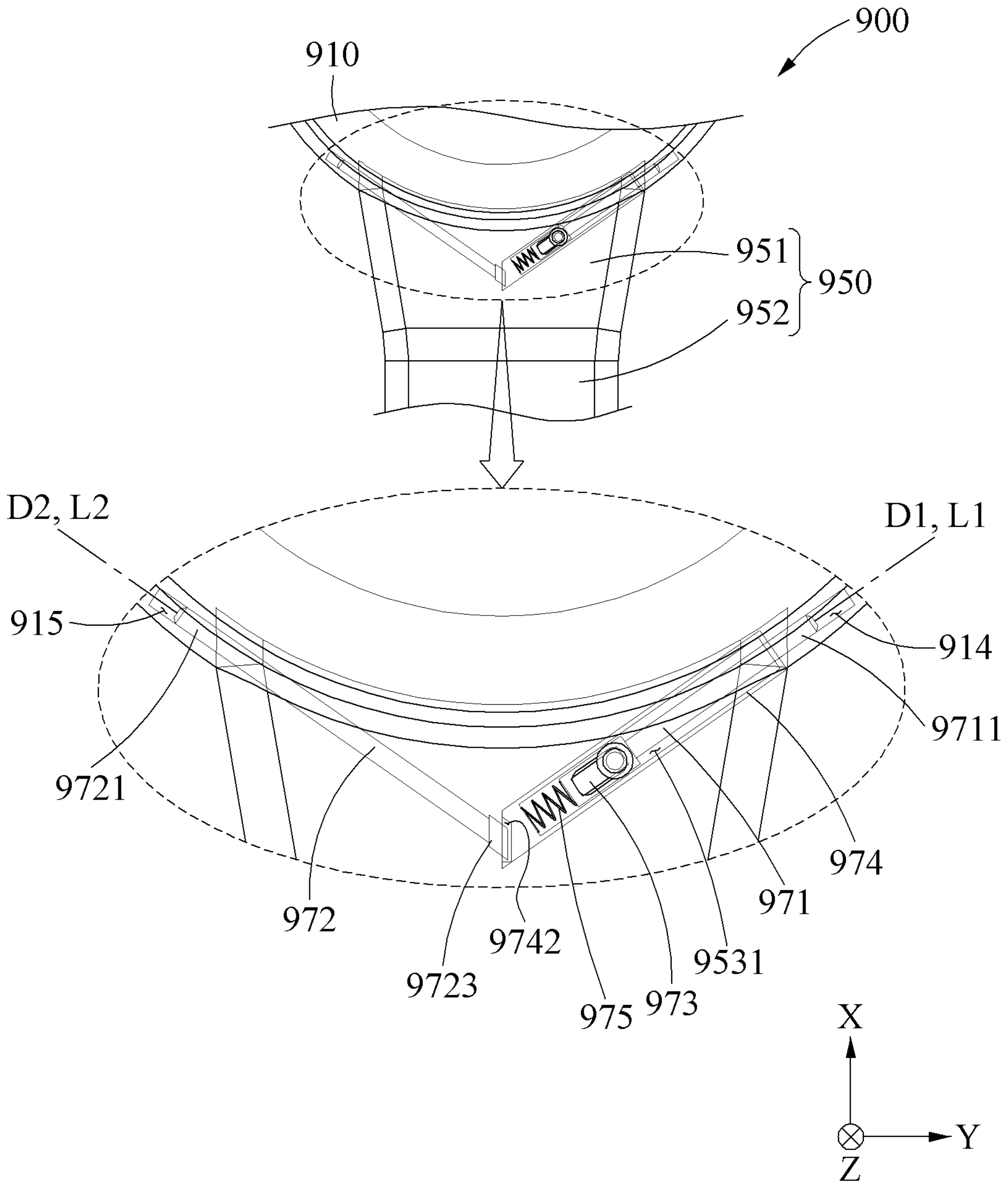
FIG. 9 is a partial perspective view of an electronic device according to an embodiment of the disclosure.

FIG. 9 is a partial perspective view of an electronic device 900 according to an embodiment of the disclosure.

In an embodiment, a side frame 910 may include a connecting slot 913, a first fastening hole 914, and a second fastening hole 915. The first fastening hole 914 and the second fastening hole 915 may be formed along a first fastening direction L1 and a second fastening direction L2, respectively.

In an embodiment, a band 950 may include a connecting portion 951 and an attachment portion 952. The connecting portion 951 may include a first fixing portion 9531 and a second fixing portion 9532 that are inserted into the connecting slot 913 along an insertion direction G1 and formed inwardly. In this case, the first fixing portion 9531 and the second fixing portion 9532 may communicate with each other inside the connecting portion 951. With the connecting portion 951 inserted in the connecting slot 913, the first fixing portion 9531 may communicate with the first fastening hole 914 and the second fixing portion 9532 may communicate with the second fastening hole 915.

In an embodiment, a fastening portion may include a first fastening pin 971, a second fastening pin 971, a cylinder 974, an elastic body 975, and a trigger 973. The first fastening pin 971 and the second fastening pin 972 may be inserted into the first fixing portion 9531 and the second fixing portion 9532, respectively, and ends 9711 and 9721 thereof may protrude outside the connecting portion 951 along a first protruding direction D1 and a second protruding direction D2, respectively. With the connecting portion 951 inserted in the connecting slot 913, the respective protruding ends 9711 and 9721 of the first fastening pin 971 and the second fastening pin 972 may be inserted into the first fastening hole 914 and the second fastening hole 915, respectively.

The cylinder 974 may include a cavity that is inserted into the inside of the first fixing portion 9531 and formed along the first protruding direction D1. The first fastening pin 971 may be inserted into the cavity and may slide along the first protruding direction D1 at an operation of the trigger 973.

In an embodiment, the cylinder 974 and the second fastening pin 972 may be coupled in a portion where the first fixing portion 9531 and the second fixing portion 9532 communicate with each other. For example, one end of the cylinder 974 may have an insertion groove 9742 into which the other end 9723 of the second fastening pin 972 is inserted. In this case, the other end 9723 of the second fastening pin 972 may be inserted and fixed to the insertion groove 9742 through force-fitting.

Figure 10:
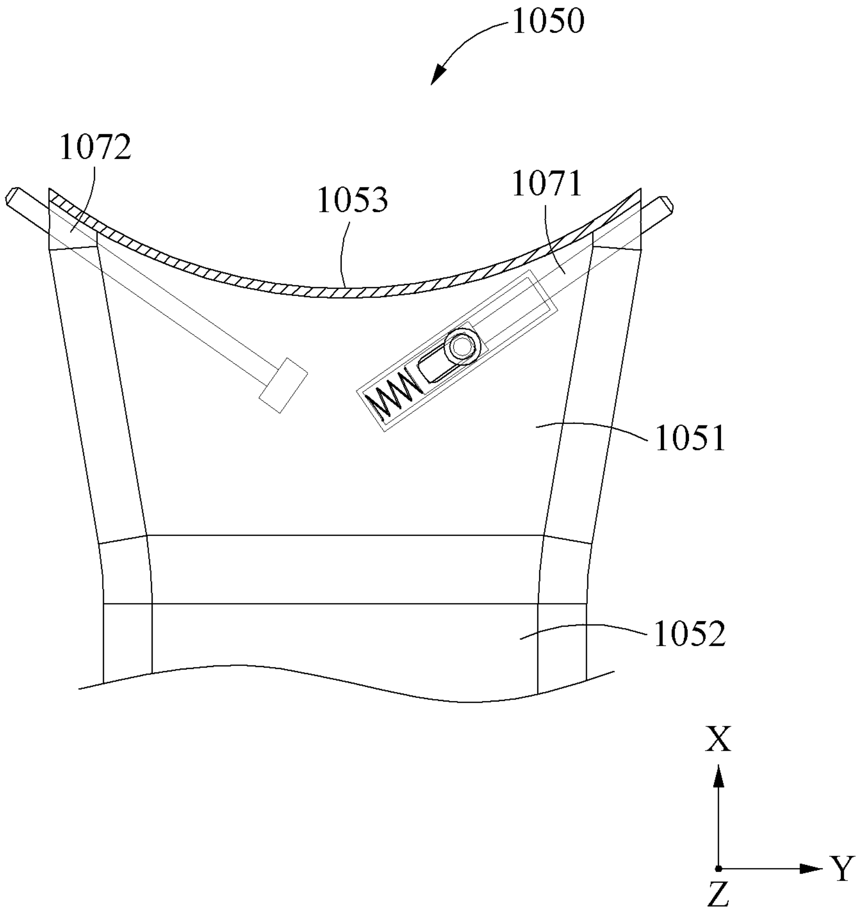
FIG. 10 is a partial perspective view of a band according to an embodiment of the disclosure.

FIG. 10 is a partial perspective view of a band according to an embodiment of the disclosure.

Referring to FIG. 10, according to an embodiment, a band 1050 may include a connecting portion 1051, an attachment portion 1052, a first fixing portion 1071, a second fixing portion 1072, and a reinforcing member 1053. Into the first fixing portion 1071 and the second fixing portion 1072, a first fastening pin (e.g., the first fastening pin 471 of FIG. 4A) and a second fastening pin (e.g., the second fastening pin 472 of FIG. 4A) may respectively be inserted and fixed.

In an embodiment, the reinforcing member 1053 may be disposed at an end of the connecting portion 1051, improving shape retention of the connecting portion 1051. In an embodiment, the reinforcing member 1053 may be formed of a material that has a higher level of stiffness than the connecting portion 1051. In an embodiment, when the connecting portion 1051 is formed of a compressible ductile material, the reinforcing member 1053 may include a material that is stiffer than the connecting portion 1051, such as, for example, a metal, a less ductile composite material (e.g., carbon fiber reinforced plastics (CFRP) and glass fiber reinforced plastic (GFRP)). Such a structure may allow the reinforcing member 1053 to provide a shape retention force such that the shape of the connecting portion 1051 remains constant regardless of an external force, thereby preventing the connecting portion 1051 from being deformed by an external force while inserted in a connecting slot (e.g., the connecting slot 413 of FIG. 4A) and escaping from the connecting slot. Thus, the reinforcing member 1053 may provide additional strength to resist disassembly of the connecting portion 1051 such that the band 1050 may be stably inserted and fixed to the connecting slot.

Figure 11:
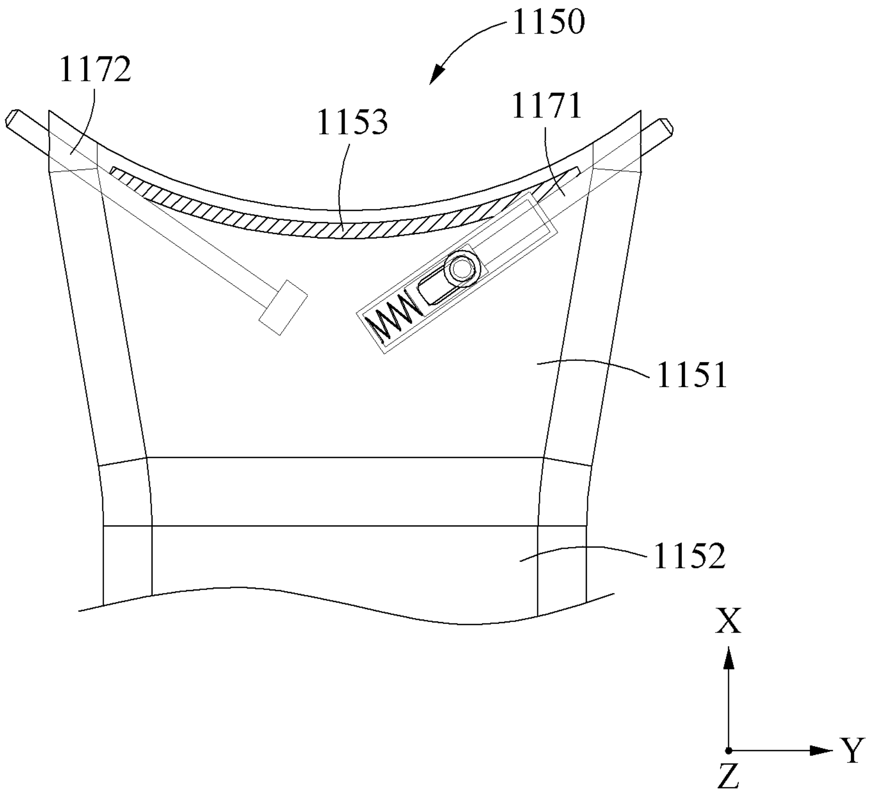
FIG. 11 is a partial perspective view of a band according to an embodiment of the disclosure.

FIG. 11 is a partial perspective view of a band according to an embodiment of the disclosure.

Referring to FIG. 11, according to an embodiment, a band 1150 may include a connecting portion 1151, an attachment portion 1152, and a reinforcing pin 1153. Inside the connecting portion 1151, a first fastening pin 1171 and a second fastening pin 1172 may be inserted and fixed.

The reinforcing pin 1153 may be inserted into an inner side of the connecting portion 1151. For example, the reinforcing pin 1153 may be inserted into the inner side of the connecting portion 1151 to extend along an end of the connecting portion 1151, for example, from the first fastening pin 1171 to the second fastening pin 1172. The reinforcing pin 1153 may be formed of a material with higher stiffness than the connecting portion 1151, thereby improving the shape retention of the connecting portion 1151.

According to various embodiments, an electronic device 400 may include: a housing 41 including a front plate 401, a rear plate 490 spaced apart from the front plate 401, and a side frame 410 enclosing an internal space between the front plate 401 and rear plate 490 along a circumferential direction of the front plate 401 and the rear plate 490; a band 450 including a connecting portion 451 detachably connected to the housing 41 and provided to be worn on a body of a user; and a fastening portion 470 configured to fasten the connecting portion 451 to the housing 41, wherein the side frame 410 may include a connecting slot 413 formed to be recessed on an outer circumferential surface 411, the connecting portion 451 may be inserted into the connecting slot 413 along an insertion direction G1, and the fastening portion 470 may connect the side frame 410 and the connecting portion 451, while passing through the side frame 410 and the connecting portion 451, in fastening directions L1 and L2 inclined with respect to the insertion direction G1, as viewed from the front plate 401.

In various embodiments, the fastening portion 470 may include: a first fastening pin 471 configured to connect the side frame 410 and the connecting portion 451 in a first fastening direction L1 inclined with respect to the insertion direction G1; and a second fastening pin 472 configured to connect the side frame 410 and the connecting portion 451 in a second fastening direction L2 inclined with respect to the insertion direction G1.

In various embodiments, the first fastening direction L1 and the second fastening direction L2 may face opposite sides of each other with respect to the insertion direction G1.

In various embodiments, an angle formed by the first fastening direction L1 and an angle formed by the second fastening direction L2 with respect to the insertion direction G1 may be substantially the same.

In various embodiments, the side frame 410 may include a first fastening hole 414 and a second fastening hole 415 that are formed between an inner circumferential surface 412 facing the internal space and an outer circumferential surface 411 exposed to the outside and communicate with the connecting slot 413, wherein the first fastening hole 414 may be formed in the first fastening direction L1 and the second fastening hole 415 may be formed in the second fastening direction L2.

In various embodiments, the first fastening pin 471 and the second fastening pin 472 may be inserted into the connecting portion 451, and ends 4711 and 4721 thereof may protrude outside the connecting portion 451. With the connecting portion 451 inserted in the connecting slot 413, the protruding ends 4711 and 4721 of the first fastening pin 471 and the second fastening pin 472 may be inserted into the first fastening hole 414 and the second fastening hole 415, respectively.

In various embodiments, such protruding portions of the first fastening pin 471 and the second fastening pin 472 with respect to the connecting portion 451 may be portions of the surface of the connecting portion 451 that contacts the inner circumferential surface 412 of the connecting slot 413.

In various embodiments, at least one of the first fastening pin 471 or the second fastening pin 472 may be movably connected to the connecting portion 451 such that the protruding ends 4711 and 4721 are received in the connecting portion 451.

In various embodiments, the connecting portion 451 may include: a first fixing portion 4531 into which at least a portion of the first fastening pin 471 is inserted; and a second fixing portion 4532 into which at least a portion of the second fastening pin 472 is inserted, wherein the first fastening pin 471 may be movable inside the first fixing portion 4531 such that an end protrudes outside the first fixing portion 4531.

In various embodiments, the fastening portion 470 may further include: a cylinder 574 disposed inside the first fixing portion 4531 and including a cavity into which the first fastening pin 471 is slidably inserted; an elastic body 575 disposed within the cavity and configured to apply an elastic force such that an end of the first fastening pin 471 protrudes outside the first fixing portion 4531; and a trigger 573 configured to connect the elastic body 575 and the first fastening pin 471 and having a portion of its surface protruding outside the cylinder 574, wherein the first fastening pin 471 may be slidable in the cavity by the trigger 573.

In various embodiments, a surface of the connecting portion 451 may have an opening 4533 formed in communication with the first fixing portion 4531 and formed along a sliding direction G1 of the first fastening pin 471, and a protruding surface of the trigger 573 may be disposed in the opening 4533.

In various embodiments, the first fixing portion 8531 and the second fixing portion 8532 may communicate with each other, the cylinder 874 may include a connecting groove 8742 through the surface to communicate with the second fixing portion 8532, and the second fastening pin 872 may be inserted into the connecting groove 8742 through such a communicating portion.

In various embodiments, a first thread may be formed in a connection groove 8742' and a second thread engaging with the first thread may be formed in the other end 8723' of the second fastening pin 872.

In various embodiments, a first fastening pin 971 and a second fastening pin 972 may be connected to each other inside a connecting portion 951.

In various embodiments, a band 1050 may further include a reinforcing member 1053 disposed in a connecting portion 1051 and provided to maintain the shape of the connecting portion 1051, and the reinforcing member 1053 may include a material of higher stiffness than the connecting portion 1051.

According to various embodiments, an electronic device may include: a housing 41 including a front plate 401, a rear plate 490 spaced apart from the front plate 401, and a side frame 410 enclosing an internal space between the front plate 401 and the rear plate 490; a band 450 including a connecting portion 451 detachably connected to the side frame 410 and provided to be worn on a body of a user; and a fastening portion 470 configured to fasten the connecting portion 451 to the side frame 410, wherein the side frame 410 may include a connecting slot 413 forming a ring shape with respect to a central axis passing through the front plate 401 and the rear plate 490 and formed to be recessed on an outer circumferential surface, at least a portion of the connecting portion 451 may be inserted into the connecting slot 413 along an insertion direction G1, and the fastening portion 470 may connect the side frame 410 and the connecting portion 451 along fastening directions L1 and L2 that are inclined with respect to an insertion direction G1 and are tangent to an imagery circle with the central axis as a center.

In various embodiments, the fastening portion 470 may include fastening pins 471 and 472 that are inserted and fixed to an inner side of the connecting portion 451 and have one ends protruding outside the connecting portion 451. With the connecting portion 451 inserted in the connecting slot 413, the protruding ends of the fastening pins 471 and 472 may be inserted into an inner side of the side frame 410 along the fastening directions L1 and L2.

In various embodiments, the side frame 410 may include fastening holes 414 and 415 that communicate with the connecting slot 413 and are formed between an inner circumferential surface facing the internal space and an outer circumferential surface exposed to the outside along the fastening directions L1 and L2, and the one ends of the fastening pins 471 and 472 may be insertable into the fastening holes 414 and 415.

In various embodiments, the fastening pins 471 and 472 may be manipulated such that the ends are received in the connecting portion 451.

In various embodiments, the fastening portion 470 may include the first fastening pin 471 and the second fastening pin 472 that connect the connecting portion 451 and the side frame 410, while passing therethrough, along the fastening directions L1 and L2 different from each other. The respective fastening directions L1 and L2 in which the first fastening pin 471 and the second fastening pin 472 connect the connecting portion 451 and side frame 410, respectively, may be disposed opposite each other with respect to the insertion direction.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
- a housing comprising:
  - a front plate,
  - a rear plate spaced apart from the front plate, and
  - a side frame enclosing an internal space between the front plate and the rear plate along a circumferential direction of the front plate and the rear plate;
- a band comprising a connecting portion that is detachably connected to the housing, and provided to be worn on a body of a user; and
- a fastening portion configured to fix the connecting portion to the housing,
- wherein the side frame comprises:
  - a connecting slot formed to be recessed on an outer circumferential surface of the side frame,
  - a first fastening hole formed in a first inner side wall of the connecting slot, and
  - a second fastening hole formed in a second inner side wall of the connecting slot opposite the first inner side wall,
- wherein at least a portion of the connecting portion is inserted into the connecting slot along an insertion direction from the outer circumferential surface toward an inner circumferential surface of the side frame, and
- wherein the fastening portion is configured to connect the side frame and the connecting portion while passing therethrough, in a fastening direction inclined with respect to the insertion direction, as viewed from the front plate.

2. The electronic device of claim 1, wherein the fastening portion comprises:
- a first fastening pin that connects the side frame and the connecting portion in a first fastening direction inclined with respect to the insertion direction, and
- a second fastening pin that connects the side frame and the connecting portion in a second fastening direction inclined with respect to the insertion direction.

3. The electronic device of claim 2, wherein the first fastening direction and the second fastening direction face opposite sides of each other, with respect to the insertion direction.

4. The electronic device of claim 3, wherein angles formed by the first fastening direction and the second fastening direction, respectively, with respect to the insertion direction are substantially the same.

5. The electronic device of claim 2,
- wherein the
- first fastening hole and the second fastening hole are formed between the inner circumferential surface facing the internal space and the outer circumferential surface exposed to the exterior and communicate with the connecting slot,
- wherein the first fastening hole is formed in the first fastening direction, and
- wherein the second fastening hole is formed in the second fastening direction.

6. The electronic device of claim 5,
- wherein the first fastening pin and the second fastening pin are inserted into the connecting portion, and one end of the first fastening pin and one end of the second fastening pin protrudes outwardly from the connecting portion, and
- wherein, with the connecting portion inserted in the connecting slot, the protruding ends of the first fastening pin and the second fastening pin are inserted into the first fastening hole and the second fastening hole, respectively.

7. The electronic device of claim 6, wherein protruding portions of the first fastening pin and the second fastening pin with respect to the connecting portion are portions on a surface of the connecting portion that contact an inner circumferential surface of the connecting slot.

8. The electronic device of claim 6, wherein at least one of the first fastening pin or the second fastening pin is movably connected to the connecting portion such that the protruding end is received in the connecting portion.

9. The electronic device of claim 2, wherein the connecting portion comprises:

a first fixing portion into which at least a portion of the first fastening pin is inserted, and a second fixing portion into which at least a portion of the second fastening pin is inserted, and wherein the first fastening pin is movable inside the first fixing portion such that an end protrudes outside the first fixing portion.

10. The electronic device of claim 9, wherein the fastening portion further comprises:

a cylinder comprising a cavity disposed inside the first fixing portion, into which the first fastening pin is slidably inserted, an elastic body disposed in the cavity and configured to apply an elastic force such that an end of the first fastening pin protrudes outside the first fixing portion, and a trigger configured to connect the elastic body and the first fastening pin and having a portion of a surface thereof that protrudes outside the cylinder, and wherein the first fastening pin is slidable in the cavity by the trigger.

11. The electronic device of claim 10, wherein, on a surface of the connecting portion, an opening that communicates with the first fixing portion and is formed along a sliding direction of the first fastening pin is formed, and wherein a protruding surface of the trigger is disposed in the opening.

12. The electronic device of claim 10, wherein the first fixing portion and the second fixing portion communicate with each other, wherein the cylinder comprises a connecting groove that passes through a surface to communicate with the second fixing portion, and wherein the second fastening pin is inserted into the connecting groove through a communicating portion.

13. The electronic device of claim 12, wherein a first thread is formed in the connecting groove, and wherein a second thread that engages with the first thread is formed at another end of the second fastening pin.

14. The electronic device of claim 2, wherein the first fastening pin and the second fastening pin are connected to each other inside the connecting portion.

15. The electronic device of claim 1, wherein the band further comprises:

a reinforcing member disposed in the connecting portion and provided to maintain a shape of the connecting portion, and wherein the reinforcing member comprises a brittle material.

16. An electronic device comprising:

a housing comprising:

a front plate, a rear plate spaced apart from the front plate, and a side frame enclosing an internal space between the front plate and the rear plate;

a band comprising a connecting portion that is detachably connected to the side frame and provided to be worn on a body of a user; and a fastening portion configured to fix the connecting portion to the side frame, wherein the side frame comprises a connecting slot that forms a ring shape with respect to a central axis passing through the front plate and the rear plate and formed to be recessed on an outer circumferential surface, wherein at least a portion of the connecting portion is inserted into the connecting slot along an insertion direction, and wherein the fastening portion is configured to connect the side frame and the connecting portion along a fastening direction that is inclined with respect to the insertion direction and that substantially contacts an imaginary circle having the central axis as a center thereof.

17. The electronic device of claim 16, wherein the fastening portion comprises:

a fastening pin inserted into an inner side of the connecting portion and having one end that protrudes to the exterior of the connecting portion, and wherein, with the connecting portion inserted in the connecting slot, the protruding one end of the fastening pin is inserted into an inner side of the side frame along the fastening direction.

18. The electronic device of claim 17, wherein the side frame comprises:

a fastening hole communicating with the connecting slot and formed between an inner circumferential surface facing an inner space and an outer circumferential surface exposed to the exterior along the fastening direction, and wherein one end of the fastening pin is insertable into the fastening hole.

19. The electronic device of claim 17, wherein the fastening pin is operable such that the one end is received inside the connecting portion.

20. The electronic device of claim 16, wherein the fastening portion comprises:

a first fastening pin and a second fastening pin that connect the connecting portion and the side frame while passing therethrough, along different fastening directions, and wherein, the fastening directions of the first fastening pin and the second fastening pin to connect the connecting portion and the side frame are disposed on opposite sides to each other with respect to the insertion direction.

* * * * *